(12) United States Patent
Masukura et al.

(10) Patent No.: US 7,146,022 B2
(45) Date of Patent: Dec. 5, 2006

(54) SPATIOTEMPORAL LOCATOR PROCESSING METHOD AND APPARATUS

(75) Inventors: Koichi Masukura, Kawasaki (JP); Osamu Hori, Yokohama (JP); Toshimitsu Kaneko, Kawasaki (JP); Takeshi Mita, Yokohama (JP); Koji Yamamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 655 days.

(21) Appl. No.: 10/156,107

(22) Filed: May 29, 2002

(65) Prior Publication Data
US 2002/0181741 A1 Dec. 5, 2002

(30) Foreign Application Priority Data
May 30, 2001 (JP) ............................. 2001-163274

(51) Int. Cl.
*G06K 9/00* (2006.01)
(52) U.S. Cl. ................. 382/103; 382/294; 348/169
(58) Field of Classification Search ................. 345/475
See application file for complete search history.

(56) References Cited

U.S. PATENT DOCUMENTS

| | | | | |
|---|---|---|---|---|
| 5,444,791 A | * | 8/1995 | Kamada et al. | 382/190 |
| 5,615,319 A | * | 3/1997 | Metzger et al. | 345/427 |
| 6,144,972 A | * | 11/2000 | Abe et al. | 715/501.1 |
| 2005/0280657 A1 | | 12/2005 | Hori et al. | |

FOREIGN PATENT DOCUMENTS

| | | |
|---|---|---|
| JP | 6-96186 | 4/1994 |
| JP | 9-190549 | 7/1997 |
| JP | 10-198821 | 7/1998 |
| JP | 2001-111996 | 4/2001 |
| JP | 2001-118075 | 4/2001 |

OTHER PUBLICATIONS

Eledath et al "Real-Time Fixation, Mosaid Construction and Moving Object Detection from a Moving Camera", Applications of Computer Vision, 1998.*
Pending U.S. Appl. No. 09/493,192, filed Jan. 28, 2000, Masukura et al.
Pending U.S. Appl. No. 09/612,497, filed Jul. 7, 2000, Masukura et al.
Pending U.S. Appl. No. 09/633,231, filed Aug. 4, 2000, Masukura et al.
Pending U.S. Appl. No. 09/808,988, filed Mar. 16, 2001, Masukura et al.
Pending U.S. Appl. No. 09/852,620, filed May 11, 2001, Masukura et al.
Pending U.S. Appl. No. 10/156,107, filed May 29, 2002, Masukura et al.

* cited by examiner

*Primary Examiner*—Bhavesh M. Mehta
*Assistant Examiner*—Christopher Lavin
(74) *Attorney, Agent, or Firm*—Oblon, Spivak, McClelland, Maier & Neustadt, P.C.

(57) ABSTRACT

A spatiotemporal locator processing method of correcting a spatiotemporal locator capable of specifying a trajectory of a representative point of an approximate figure representing an arbitrary region in order to represent a transition of the region over a plurality of frames in video data, obtains the trajectory of the representative point based on the spatiotemporal locator, displays the obtained trajectory of the representative point on a screen, receives input of a correction instruction for the trajectory displayed on the screen, and corrects the spatiotemporal locator based on the correction instruction.

24 Claims, 18 Drawing Sheets

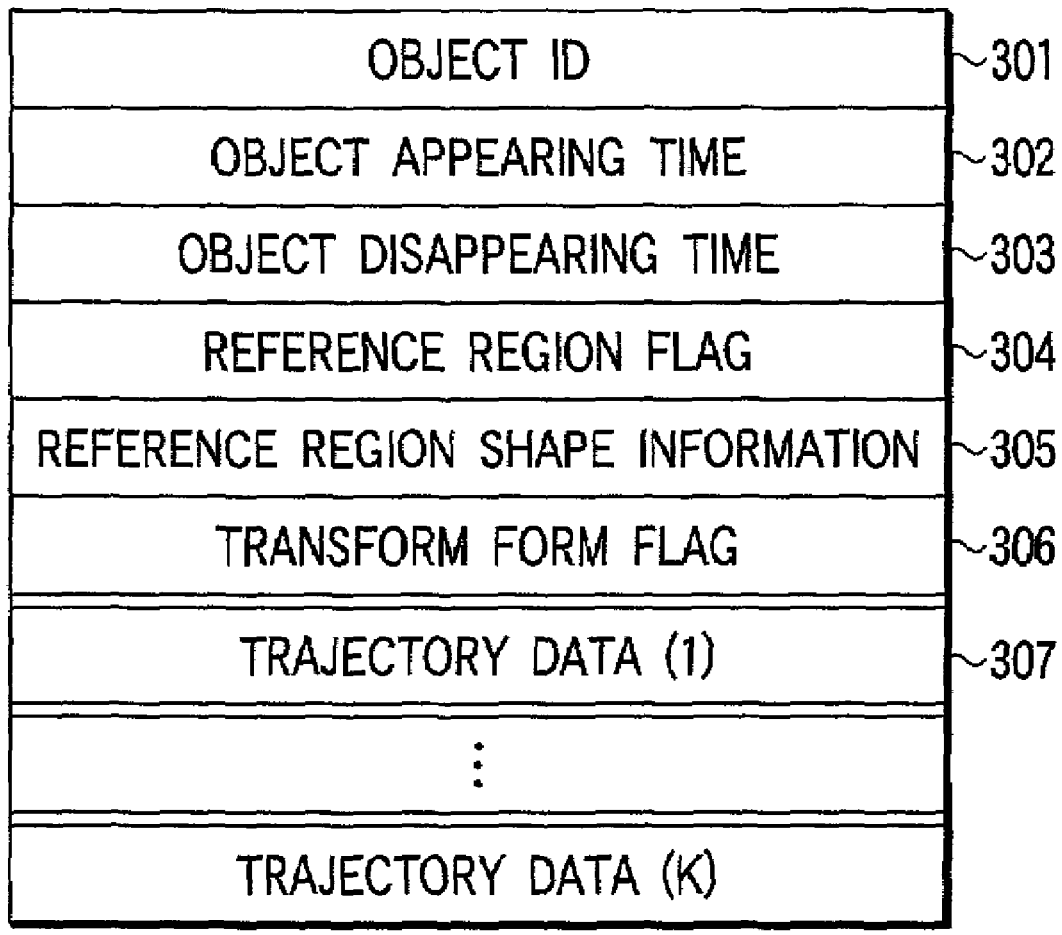
F I G. 14

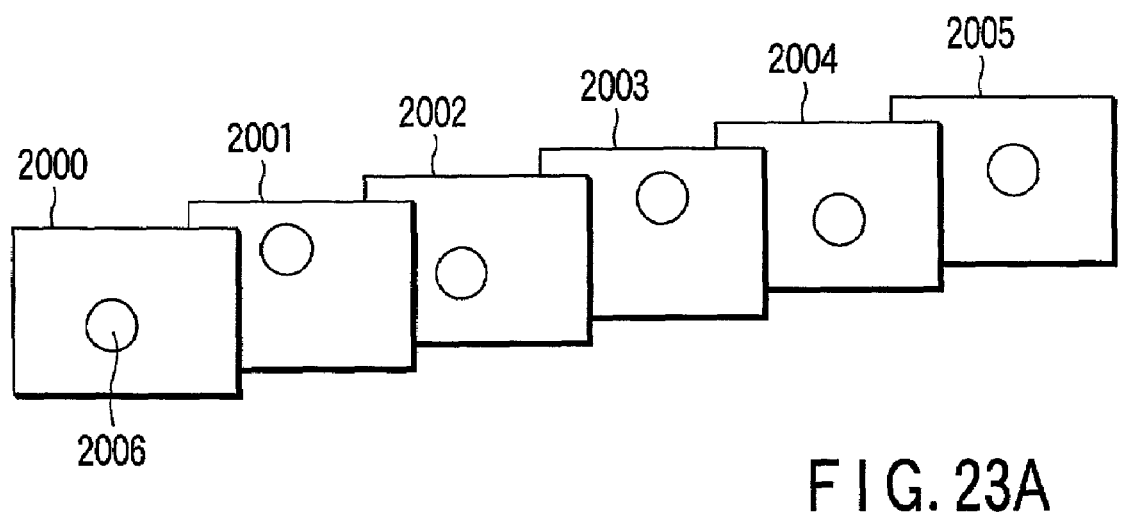
FIG. 23A
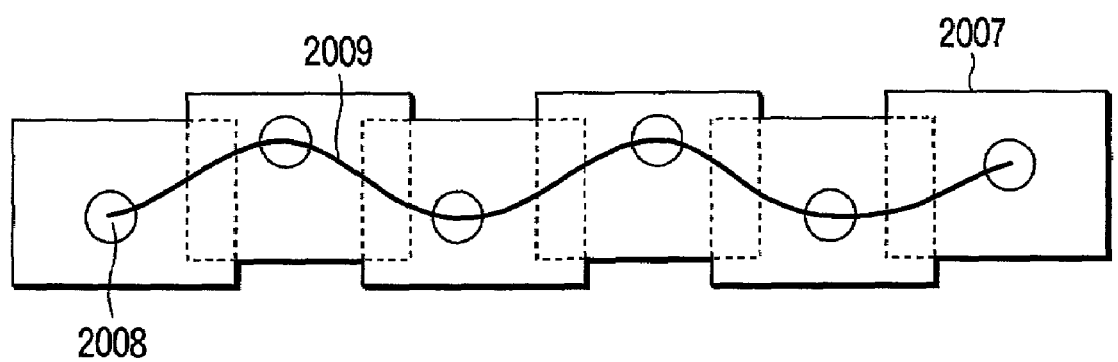
FIG. 23B

SPATIOTEMPORAL LOCATOR PROCESSING METHOD AND APPARATUS

CROSS-REFERENCE TO RELATED APPLICATIONS

This application is based upon and claims the benefit of priority from the prior Japanese Patent Application No. 2001-163274, filed May 30, 2001, the entire contents of which are incorporated herein by reference.

BACKGROUND OF THE INVENTION

1. Field of the Invention

The present invention relates to a spatiotemporal locator processing method and apparatus which display an arbitrary spatiotemporal region shape in image data in a 3D space with X, Y, and time axes and manipulate the displayed shape in the 3D space, thereby inputting and correcting a spatiotemporal locator.

2. Description of the Related Art

Along with the recent rapid progress in image processing technology, videos (moving images) and still images are generally processed as digital data. With this digitalization, techniques of efficiently compressing image data having large data amounts have been established. In addition, development of network technologies such as the Internet and satellite broadcasting/CATV allows processing of a large quantity of image data. An image database or video-on-demand system in which image data are stored in advance, and extracted and used as needed is being put into practical use. Automatic monitoring system from a remote site is also becoming major. As described above, in using images, there are requirements to recognize an object in an image, conversely, to search for and extract an image containing a desired object, or classify images.

To meet these requirements, the present assignee has already proposed a method of efficiently describing an arbitrary spatiotemporal locator over a plurality of frames in a video (e.g., U.S. patent application Ser. No. 09/612,497 or 09/633,231).

When an operator designates a spatiotemporal region of one frame, spatiotemporal regions of the remaining frames are automatically extracted. If the operator wants to correct the designated spatiotemporal region or automatically extracted spatiotemporal region, numerical value information (e.g., XML data) that indicates this region must be changed for each frame. The numerical value must be changed in consideration of the shapes of spatiotemporal regions in preceding and succeeding frames or in all frames. Hence, correction is very difficult.

BRIEF SUMMARY OF THE INVENTION

The present invention has been made to cope with the above-described situation, and has as its object to provide a spatiotemporal locator processing method and apparatus capable of efficiently inputting/correcting a spatiotemporal locator while referring to some or all spatiotemporal region shapes.

According to an embodiment of the present invention, there is provided a spatiotemporal locator processing method of correcting a spatiotemporal locator capable of specifying a trajectory of a representative point of an approximate figure representing an arbitrary region in order to represent a transition of the region in video data over a plurality of frames, comprising:
obtaining the trajectory of the representative point based on the spatiotemporal locator;
displaying the obtained trajectory of the representative point on a screen;
receiving input of a correction instruction for the trajectory displayed on the screen; and
correcting the spatiotemporal locator based on the correction instruction.

BRIEF DESCRIPTION OF THE SEVERAL VIEWS OF THE DRAWING

FIG. 14 is a view showing an example of the data structure of a spatiotemporal locator according to a second embodiment of the present invention;

FIGS. 23A and 23B are views showing the processing procedure of an object region information describing method using mosaicing.

DETAILED DESCRIPTION OF THE INVENTION

Figure 1:
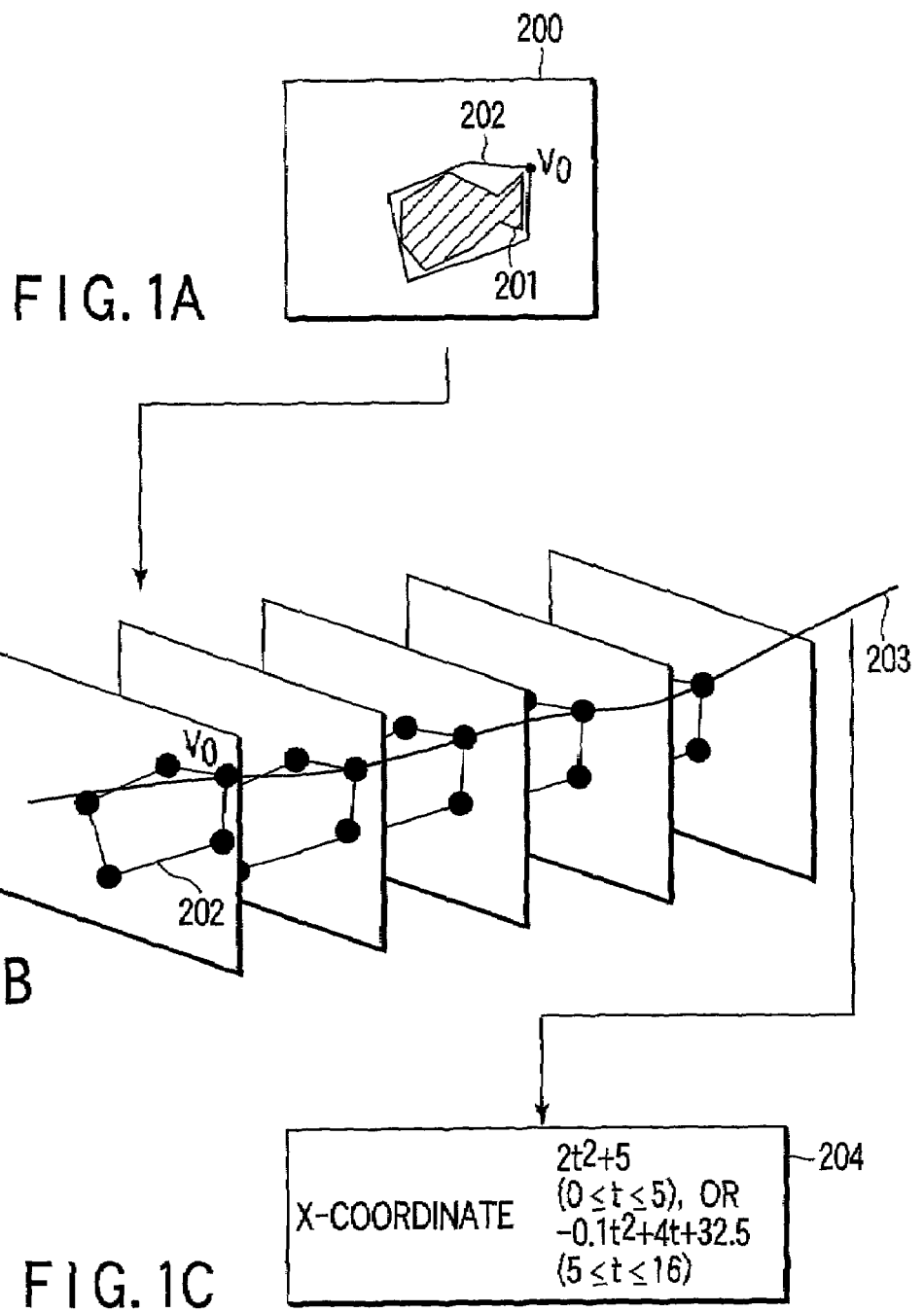
FIGS. 1A, 1B, and 1C are views for explaining an outline of processing of describing an object region in a video by a spatiotemporal locator.

Embodiments of spatiotemporal locator processing method and apparatus according to the present invention will be described below with reference to the accompanying drawing.

First Embodiment

A spatiotemporal locator processing apparatus according to the first embodiment of the present invention is a system having a function of causing a user to execute processing such as editing (or correcting) for a spatiotemporal locator.

A spatiotemporal locator will be briefly described first.

The contents, creation method, and use method of the spatiotemporal locator are disclosed in detail in, e.g., U.S. patent application Ser. No. 09/612,497 or 09/633,231 assigned to the present assignee. The object region data disclosed in these prior applications corresponds to one form of the spatiotemporal locator.

The contents and creation method of the spatiotemporal locator will be briefly described.

The spatiotemporal locator is information which represents a spatiotemporal region (e.g., temporal transition of a 2D region in each frame) from appearance to disappearance of a specific region arranged on a display window (e.g., a GUI window) for various purposes. The spatiotemporal locator normally accompanies video data (the video data itself can have any contents such as a photorealistic image, processed data of the photorealistic image, CG, animation, or a combination thereof). Video data is assumed to be comprised of a plurality of frames (still images). In this specification, video data indicates both a moving image and a still image.

This specific region can be used as, e.g., a region that indicates a specific object in the video data. In this case, the shape of the specific region in a given frame represents (or approximately represents) the region of the specific object in that frame. An object region means a set of region portions in a video. Any portion that can be grasped as an object, e.g., a man, animal, plant, car, building, road, river, sun, or cloud, can be handled. It may be an independent object. Alternatively, it may be part of an object (e.g., the head of a man, the bonnet of a car, or the entrance of a building) or a set of objects (e.g., a group of birds or fish).

Creation of the spatiotemporal locator for one object region will be briefly described next with reference to FIGS. 1A, 1B, 1C, and 2.

The spatiotemporal locator can be generally created in accordance with, e.g., the following procedures. These procedures can be automated. Alternatively, user's manual operation may be inserted.

(1) The object region of an object to be processed is extracted from a predetermined frame of video data.

(2) The object region is approximated by a predetermined figure.

(3) Representative points that specify the approximate figure are extracted.

Procedures (1) to (3) are done for all or a plurality of frames sampled from a frame in which the approximate figure for the object region appears to a frame in which the figure disappears.

(4) The time series variation of positions (or any quantity that can specify the positions) of each representative point is approximately expressed by a function (approximate function) of time t (e.g., a time stamp added to the video) or frame number f. The value of the parameter of the function for approximate expression is the value to be obtained. The functions are separately expressed for the representative points and also for X- and Y-coordinates.

Procedures (1) to (4) are done for each object region to be processed.

Approximate figure includes various figures such as a polygon whose number of sides is used as a parameter, a polygon such as a rectangle with a fixed number of sides, a circle, and an ellipse. In addition, various kinds of representative points can be used in accordance with the type of figure. For example, the apexes of a polygon, four or three apexes of a rectangle, the center of a circle and one point on its circumference or two end points of its diameter, four or three apexes of the circumscribing rectangle of an ellipse, or two foci of an ellipse and one point on it can be used.

When the parameter of a function is stored, the function can be obtained from the parameter. The X-Y coordinate values of each representative point at desired time t or frame number f can be obtained based on the function. The region of the approximate figure at the desired time t or frame number f can be obtained from the X-Y coordinate values of each representative point.

FIGS. 1A, 1B, 1C, and 2 show an example in which a polygon is used as an approximate figure for an object region, the apexes of the polygon are defined as representative points, and a quadratic polynomial spline function is used as an approximate function for the trajectory of each apex in the direction of time axis, thereby creating a spatiotemporal locator for an object "fish" in an image.

Referring to FIG. 1A, reference numeral 200 denotes a frame in a video to be processed; 201, a region of an object "fish" to be extracted; and 202, an approximate polygon obtained by approximating the object region 201.

FIG. 1B expresses the representative points of the approximate figure over a plurality of frames, i.e., the approximate polygon 202 in this example and the transition of its apexes, and the approximate curve of one apex ($V_0$).

Reference numeral 204 in FIG. 1C denotes a function obtained for the representative point $V_0$. Here, a function for only one coordinate axis of the reference representative point $V_0$ is shown. In this example, the approximate time period (t=0 to 16) is divided into two periods, i.e., t=0 to 5 and t=5 to 16.

Figure 2:
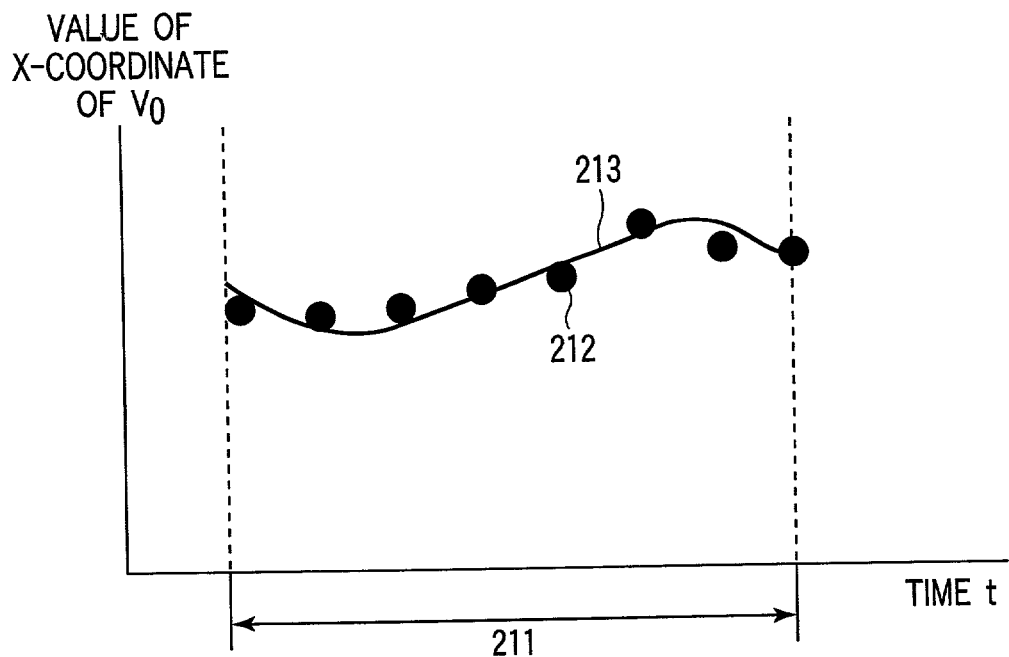
FIG. 2 is a view for explaining an example in which a function for approximating the X-coordinate value of a reference representative point is obtained.

FIG. 2 shows a function that approximates the X-coordinate value of the representative point $V_0$. Reference numeral 211 in FIG. 2 denotes a time period in which the object is present. Dots 212 indicate the X-coordinate values of the representative point $V_0$. Reference numeral 213 denotes an approximate function. An approximate function can also be obtained for the Y-coordinate in a similar manner. Since a polynomial spline function is used as an approximate function, a polynomial is defined for each of time periods divided by points called knots in the function 204 shown in FIG. 1C. In this case, t=0, 5, and 16 are knot times.

This also applies to representative points other than the representative point $V_0$.

Figure 3:
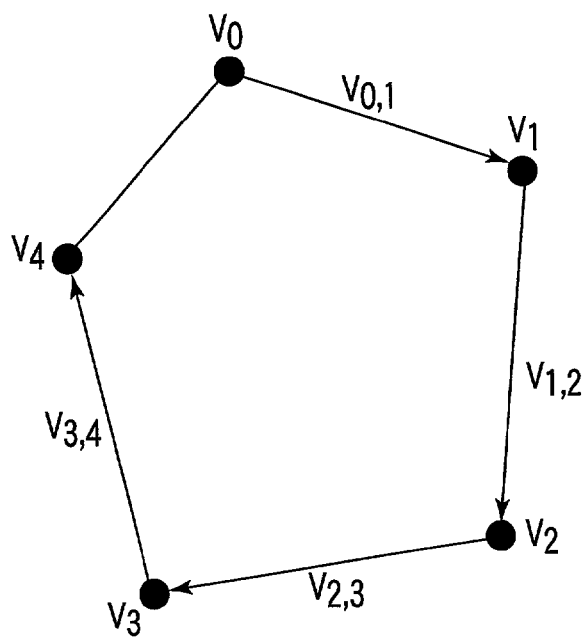
FIG. 3 is a view for explaining difference vectors that indicate representative points other than the reference representative point.
Figure 4:
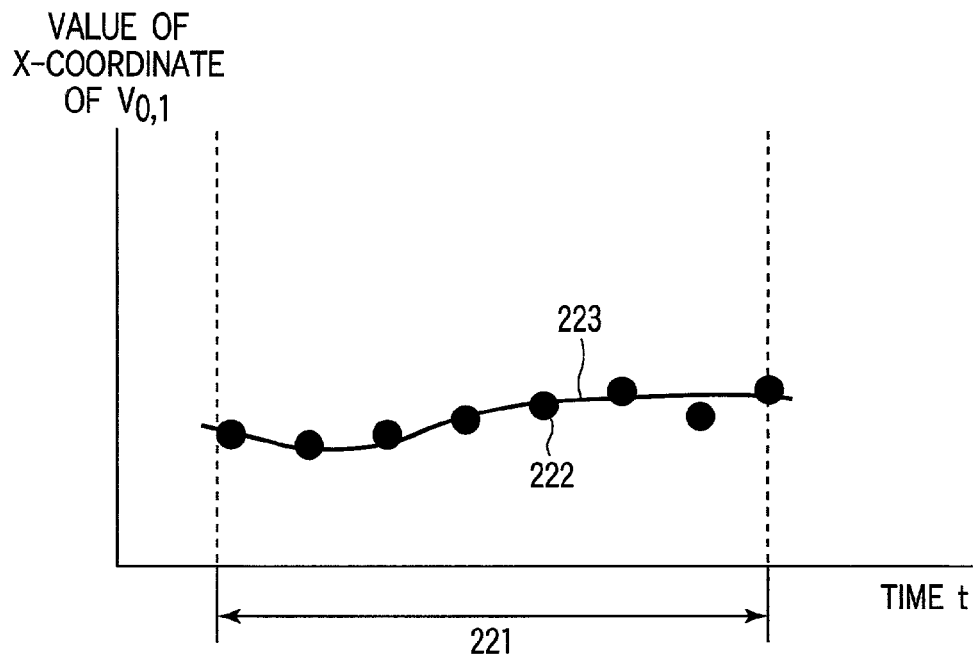
FIG. 4 is a view for explaining an example in which a function for approximating the X-coordinate value of a difference vector that indicates a representative point other than the reference representative point.

For each representative point other than the representative point $V_0$, it may be expressed by a relative relationship from another representative point, e.g., a difference vector and described by the trajectory of the vector, instead of describing the representative point using absolute coordinates. FIG. 3 is a view for explaining the reference representative point $V_0$ and difference vectors that indicate the remaining representative points. Dots 222 in FIG. 4 indicates the values of the X component of a difference vector $V_{0,1}$ at the respective times.

In the above description, the trajectory of the position of the representative point or the trajectory of the difference vector is approximated for each frame. Instead, a trajectory of a parameter of a function that converts a representative point position or a difference vector in a given reference frame into a representative point position or a difference vector in each frame may be approximated. Alternatively, a trajectory of a parameter of a function that converts a representative point position or a difference vector in a given frame into a representative point position or a difference vector in a succeeding frame may be approximated.

The form (description form) of the spatiotemporal locator has various variations. The present invention can be applied to a spatiotemporal locator in any form.

In some cases, predetermined attribute information or related information is added to the spatiotemporal locator for a predetermined unit, e.g., for each frame and each representative point corresponding to each object region, or for each object region and each frame, for each representative point of each object region, or for each object region. The present invention can also be applied to such a spatiotemporal locator.

Figure 5:
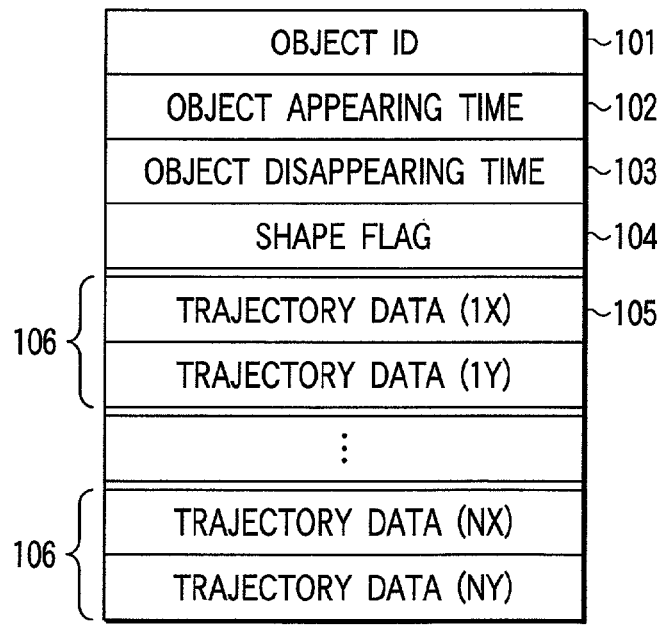
FIG. 5 is a view showing an example of the data structure of the spatiotemporal locator.

FIG. 5 shows an example of the data structure of the spatiotemporal locator to be used for the description of this embodiment. As shown in FIG. 5, the spatiotemporal locator of this example is described for each object region and contains spatiotemporal locator identification information (to be referred to as an "object ID" hereinafter) 101, object appearing time 102, object disappearing time 103, a shape flag 104, and trajectory data 105.

The object ID 101 is an identification number assigned to each spatiotemporal region.

The object appearing time 102 and object disappearing time 103 indicate times between which the spatiotemporal region assigned the object ID is present. The object appearing time and object disappearing time may be expressed by time stamps or frame numbers.

The shape flag 104 indicates how the region shape is expressed. Since a region shape is expressed by, e.g., a rectangle, ellipse, or polygon, information capable of uniquely discriminating between them is described. For a polygon, information representing the number of apexes is also added to the shape flag.

The trajectory data 105 is parameter data at each representative point and expresses the spatiotemporal region. With this data, the spatiotemporal region shape from the object appearing time to the object disappearing time can be determined. For example, when a region has a rectangular or polygonal shape, a parameter obtained by approximating the trajectory of each apex by a function is used. When a region has an elliptical shape, a parameter obtained by approximating, by a function, the trajectory of each apex of the circumscribing rectangle of the ellipse is used. Since the trajectory data 105 are separately described for X- and Y-coordinate trajectories per representative point, as indicated by reference numeral 106, N (the number of representative points)×2 trajectory data are present.

Figure 6:
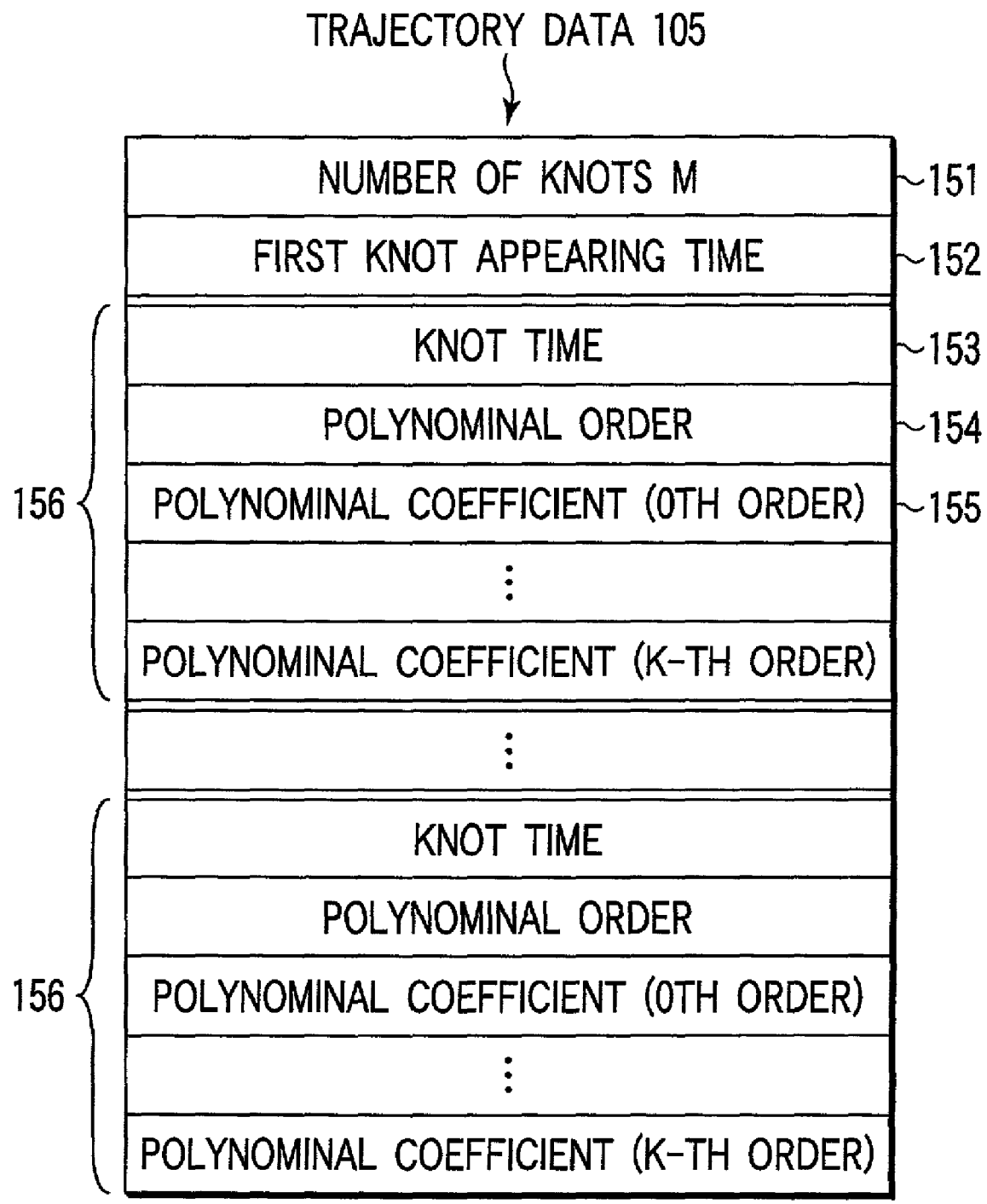
FIG. 6 is a view showing an example of the data structure of trajectory data.

FIG. 6 shows an example of the data structure of each trajectory data 105 in the spatiotemporal locator shown in FIG. 5. This represents a continuous trajectory interpolated by, e.g., a spline function and stores the relationship between time and a parameter such as an X-coordinate or Y-coordinate.

A number 151 of knots represents a number M of knots of a spline function. This indicates that (M−1) polynomial data 156 are present. Since a spline function is expressed by different polynomials for the respective intervals between adjacent knots, polynomials whose number corresponds to the number of knots are necessary. Hence, the plurality of data 156 each containing a knot time, polynomial order, polynomial coefficients, and the like are repeatedly described.

First knot appearing time 152 represents the time of the first knot of the spline function.

Knot time 153 represents the knot time of the end of the polynomial data 156. This means that the polynomial data 156 is effective until this knot time. The knot time 153 may be described by a frame number or a time stamp. The number of polynomial coefficient data 155 changes depending on the highest order of the spline function (letting K be the highest order, the number of coefficient data 155 is K+1). For this reason, the number of coefficient data 155 is stored in a polynomial order 154. The polynomial order 154 is followed by polynomial coefficient data 155 whose number equals the number of polynomial orders +1.

A method of using such a spatiotemporal locator will be briefly described.

In a system having a function of displaying video data and a function of using the spatiotemporal locator accompanying the video data, each representative point of the approximate figure of an object region in a frame to be processed is obtained based on the spatiotemporal locator (one frame sometimes contains a plurality of approximate figures of object regions). The region of the approximate figure in that frame is obtained from each representative point of the approximate figure of the object region. Then, the outer appearance (contour) of the approximate figure is displayed on the video data, or a range corresponding to the interior of the approximate figure out of the video data is displayed in a specific display form. Alternatively, assume that the user indicates a point on the video that is being displayed on the screen with a pointing device such as a mouse. If the approximate figure of the object region is present at that time (frame), and the indicated position is in the approximate figure, it is determined that the object to be processed is designated, and certain processing is executed. In this way, an effective system or graphical user interface (GUI) can be provided.

For example, when related information (e.g., characters, voice, still image, moving image, an appropriate combination thereof, or pointer information representing storage address thereof) is added to the spatiotemporal locator, or a database containing related information related to each object ID independently of the spatiotemporal locator is present, the system can be used for hyper media or object search. For example, the user designates the object (or the object and its adjacent portion) with a mouse or the like. It is then determined whether the designated time/position is inside or outside the object region. If it is determined that the designated time/position is inside the object region, related information related to the object can be searched for or displayed. For example, when the video is a content such as a movie, the object is a character such as an actor or another object that appears on a scene, and the related information is a description about the actor or his role, a viewer who is watching the movie can browse the description about the desired actor only by clicking the image of the actor. Similarly, the system can be applied to any electronic content such as an electronic encyclopedia or electronic catalog.

The related information may be, e.g., data that describes a program or computer operation, or pointer information representing its storage address. In this case, the user can make the computer execute predetermined operation by designating the object.

In, e.g., searching for an object, an object that matches a condition can be searched for using, as a search key, the passing or non-passing position of the object, the size at a given position, the stay time at a given position, or the like. For any search key, it representative point coordinates can be sequentially extracted from a time period where the object is present, and it can be determined whether an arbitrary point is inside or outside the figure formed by the representative points. Alternatively, it can be determined whether the condition is satisfied, by calculating the area. If a keyword is described in the related information, the object can be searched for by the keyword. When feature amounts such as a shape, texture, activity, and color, which are extracted from the object, are described in the related information, the object can be searched for based on such a feature amount. In addition, a monitoring system which monitors a suspicious person and the like based on feature amounts such as the shape, texture, activity, and color of an object obtained by analyzing the spatiotemporal locator can be implemented.

A method of providing video data or the spatiotemporal locator will be described next.

When the spatiotemporal locator created by a creator is to be used by a user, the spatiotemporal locator must be provided from the creator side to the user side by some method. Various forms are available as a providing method, as will be exemplified below.

(1) A form in which video data and its spatiotemporal locator are simultaneously provided.

(2) A form in which video data is provided alone, and its spatiotemporal locator is separately provided.

(3) A form in which video data and its spatiotemporal locator are provided by method (1) or (2), and related information and the like are provided simultaneously with or independently of providing with method (1) or (2).

As a means for providing data or information, for example, data or information is recorded on one or a plurality of recording media and provided, data or information is provided (or a user acquires data or information) through a network, or a combination of the above methods can be used.

The spatiotemporal locator processing apparatus of this embodiment can be mounted either on the creator-side system or on the user-side system. The apparatus may be mounted on a system having a function of generating the spatiotemporal locator to edit the spatiotemporal locator generated by the system. Alternatively, the apparatus may be mounted on a system having a function of generating the spatiotemporal locator or a system having no function of generating the spatiotemporal locator to edit the spatiotemporal locator loaded from an external device.

The spatiotemporal locator processing apparatus of this embodiment will be described below in detail.

A case wherein the spatiotemporal locator shown in FIGS. 5 and 6 is to be edited will be exemplified here.

Figure 7:
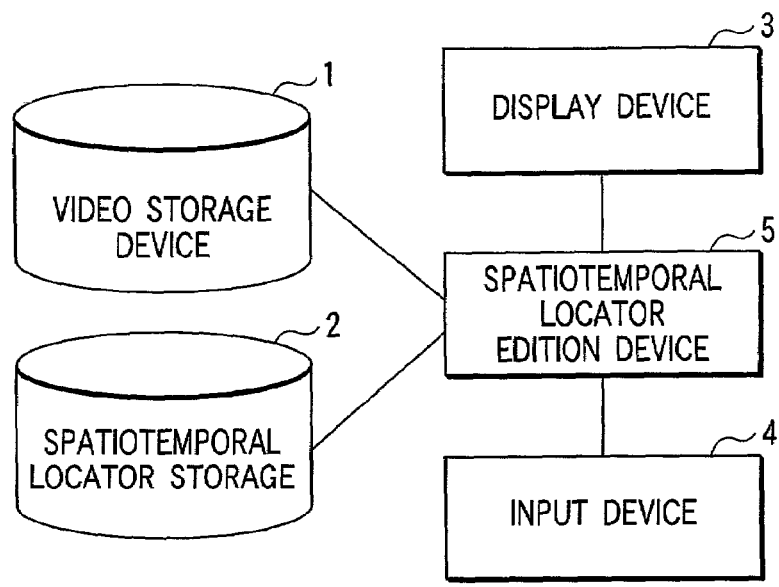
FIG. 7 is a block diagram showing an arrangement of the spatiotemporal locator processing apparatus according to an embodiment of the present invention.

FIG. 7 shows an arrangement of the spatiotemporal locator processing apparatus according to this embodiment. This example comprises a video storage device 1, spatiotemporal locator storage 2, display device 3, input device 4, and spatiotemporal locator editing device 5.

This spatiotemporal locator processing apparatus can be implemented by executing a program on a computer. The program may be incorporated as one function of another software. Software such as an OS, driver software, packet communication software, or encryption software having desired functions, or hardware such as a communication interface device, external storage device, or input/output device can be mounted on or connected to the computer, as needed.

The video storage device 1 stores video data. The video storage device 1 is formed from, e.g., a hard disk, optical disk, or semiconductor memory.

The spatiotemporal locator storage 2 stores the spatiotemporal locator (represented by, e.g., the trajectory of each apex of an approximate rectangle or approximate polygon representing an object region or the trajectory of each apex of a rectangle that circumscribes an approximate ellipse) in the video data stored in the video storage device 1. The spatiotemporal locator storage 2 is formed from, e.g., a hard disk, optical disk, or semiconductor memory. As described above, the spatiotemporal locator having the data structure shown in FIGS. 5 and 6 is exemplified here. However, the spatiotemporal locator can have each data element in an arbitrary form. That is, the spatiotemporal locator can have any data structure.

The video storage device 1 and spatiotemporal locator storage 2 may be present either on a single physical device or on different physical devices.

The spatiotemporal locator editing device 5 executes processing related to display of video information or the spatiotemporal locator, or processing related to correction of the spatiotemporal locator.

The display device 3 executes display related to the video information or the spatiotemporal locator. The input device 4 inputs a designation input or selection input from the user. The display device 3 and input device 4 construct a graphical user interface (GUI).

The spatiotemporal locator is arranged and displayed in a 3D space of (X, Y, time) as, e.g., the trajectory of each representative point of a figure representing an object region (e.g., the trajectory of each apex of an approximate rectangle or approximate polygon representing the object region or the trajectory of each apex of a rectangle that circumscribes an approximate ellipse), though this will be described later in detail. Video information corresponding to the spatiotemporal locator is displayed in the 3D space with or without processing the images of some or all frames of the video information. However, the video information need not always be displayed.

Figure 8:
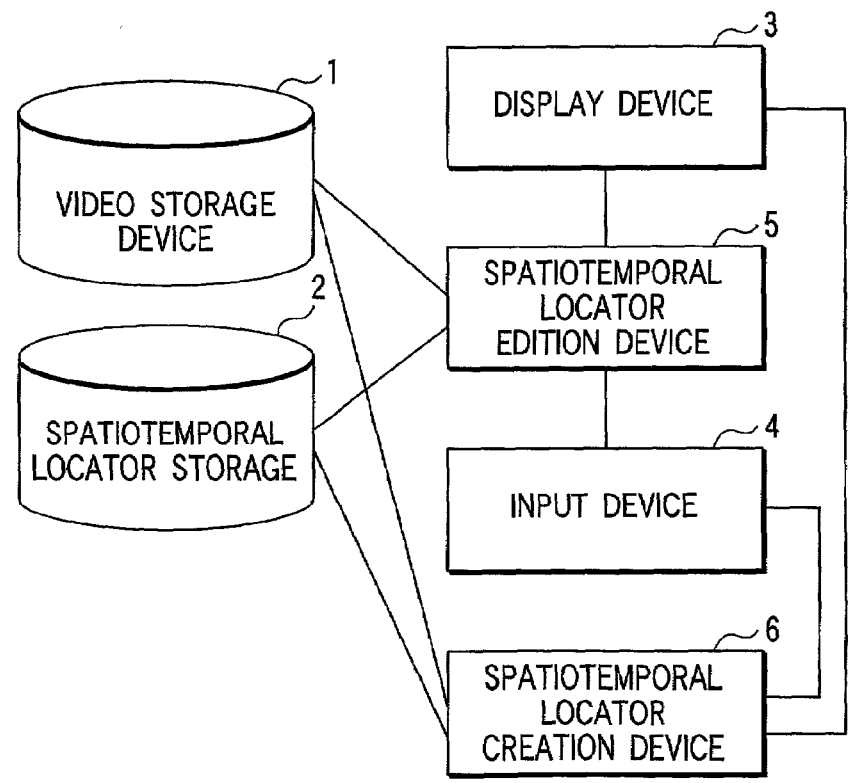
FIG. 8 is a block diagram showing another arrangement of the spatiotemporal locator processing apparatus according to the embodiment of the present invention.

The spatiotemporal locator processing apparatus may have a spatiotemporal locator creating device 6 for creating the spatiotemporal locator in addition to the arrangement shown in FIG. 7. FIG. 8 shows this arrangement. As the spatiotemporal locator creating device 6, the arrangement disclosed in detail in U.S. patent application Ser. No. 09/612,497 or 09/633,231 that was assigned to the present assignee can be used.

In displaying the spatiotemporal locator on the display device 3, the 3D space must be displayed. To do this, processing using a technique such as holograph or virtual reality capable of displaying a 3D space can be used. Alternatively, the 3D space may be displayed on a normal display by projecting the 3D space onto a 2D plane. In this case, however, since some objects may be hidden due to projection, an interface for moving the viewing direction or viewpoint is preferably prepared.

As the input device 4, a keyboard or mouse can be used. Alternatively, an input device such as a 3D mouse operated in a space may be used.

Figure 9:
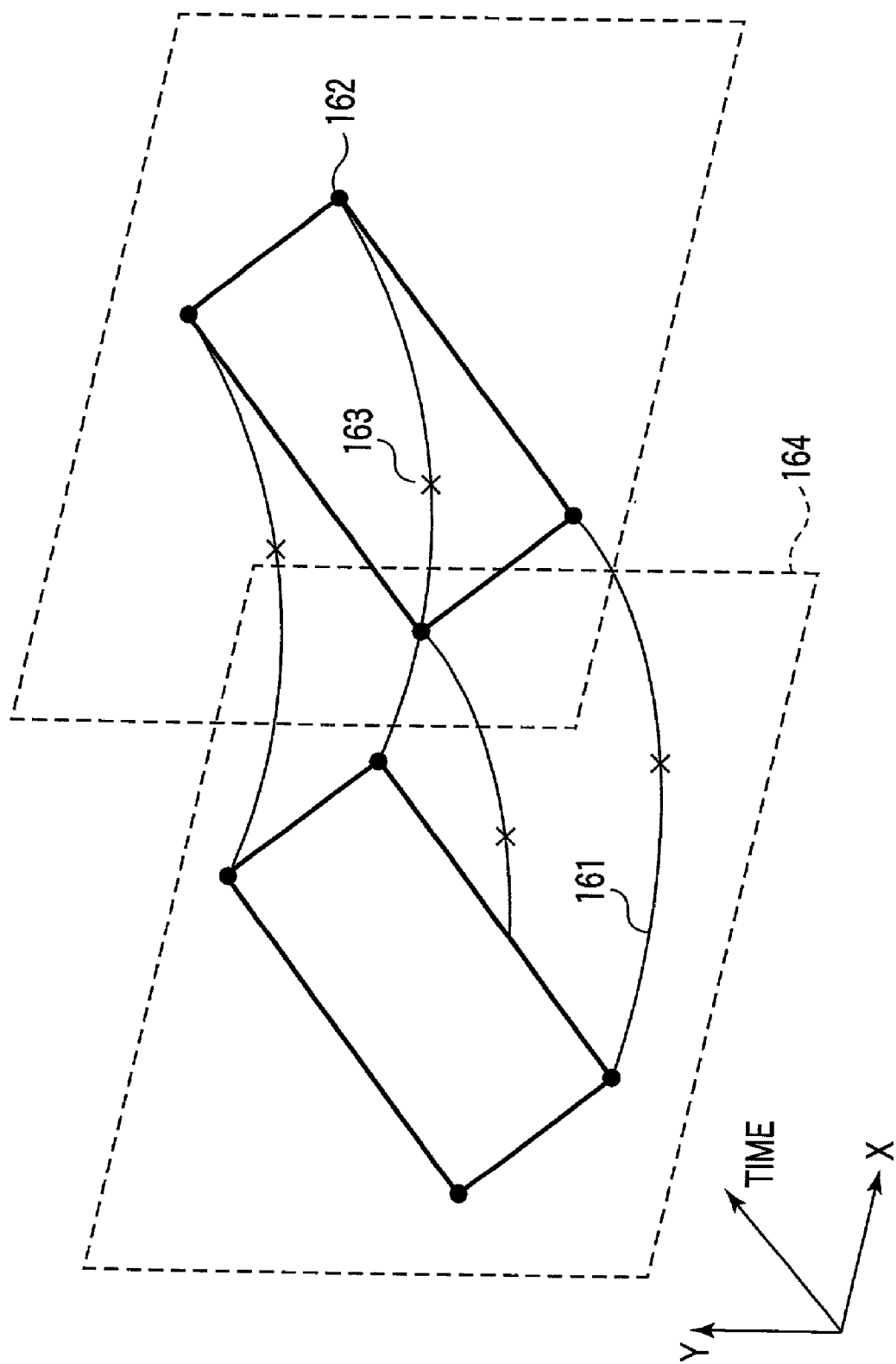
FIG. 9 is a view showing the concept of spatiotemporal locator processing.

FIG. 9 shows the concept of display of the spatiotemporal locator and video information.

The spatiotemporal locator editing device 5 obtains the trajectories of the representative points of a figure representing an object region based on the spatiotemporal locator to be edited and displays the trajectories as curves like representative point trajectories 161. The representative point trajectories 161 may be displayed using different colors or different line types such as a solid line and broken line. The manner the trajectories are displayed may be set in advance or arbitrarily set by the user.

The spatiotemporal locator editing device 5 displays knots 162 and control points 163, which serve as points to specify the representative point trajectories 161. The knots 162 are described in the spatiotemporal locator. The control points 163 are points located on the representative point trajectories 161 except knot coordinates. The control points 163 are automatically calculated based on the spatiotemporal locator depending on how to arrange the control points 163. How to arrange the control points 163 will be described later. The knots 162 and control points 163 are preferably displayed using colors or shapes easy to discriminate. Referring to FIG. 9, the knots 162 are indicated by ".", and the control points 163 are indicated by "X". The knots 162 and control points 163 can be displayed in any forms as far as they can be discriminated. All or some of the knots 162 and control points 163 need not always be displayed. In addition, the user may be able to decide whether the knots 162 and control points 163 should be displayed or switch the display method.

The knots 162 or control points 163 are used by the user to input a correction instruction for the spatiotemporal locator. In the spatiotemporal locator processing apparatus, when the user wants to correct the spatiotemporal locator, he arbitrarily selects the knot 162 or control point 163 by, e.g., drag and drop operation using a mouse and moves it in an arbitrary direction (one, two, or three arbitrary dimensions of the X, Y, and time directions) by an arbitrary amount (i.e., inputs an arbitrary moving vector), thereby inputting the correction instruction for the spatiotemporal locator. In moving the knots 162 or control points 163 by drag and drop operation, the knots 162 or control points 163 may be selected and moved one by one. Alternatively, a plurality of knots 162 or control points 163 may be selected and moved together.

When all or some of the knots 162 and control points 163 are not displayed, for example, the knot 162 or control point 163 near a position indicated by the user using a mouse is assumed to be selected.

The spatiotemporal locator processing apparatus calculates the spatiotemporal locator corresponding to the position of the moved (corrected) knot 162 or control point 163.

As shown in FIG. 6, one representative point trajectory is represented as a set of interpolation functions from a given knot time to the next knot time. To specify one representative point trajectory, all knot times and the parameters of interpolation functions between the knots are specified.

Assume that a representative point trajectory is represented by $(X, Y, \text{time}) = (fx(t), fy(t), t)$ (where fx(t) and fy(t) are spline functions or the like) and knot times are $t_0, t_1, \ldots, t_k$ The coordinates of the knot 162 of this representative point trajectory are $(fx(t_0), fy(t_0), t_0), (fx(t_1), fy(t_1), t_1), \ldots (fx(t_k), fy(t_k), t_k)$ The coordinates of the knot 162 represent the coordinates of the representative point trajectory at knot time. The user can know the knot time and the coordinates of the representative point trajectory at the knot time from the position of the knot 162.

When the interpolation function between knots is interpolated by a linear function, the shape of the representative point trajectory 161 can be uniquely specified by displaying the coordinates of the knot 162. When only a minimum and necessary number of control points 163 are to be displayed, and the interpolation function is a linear function, no control points 163 are displayed.

However, when the interpolation function between the knots is interpolated by a function of second or more order, the shape of the interpolation function cannot be uniquely specified only by the knots 162. In this case, the control points 163 are displayed such that the shape of the interpolation function can be uniquely specified.

The control point 163 can be displayed on any coordinates as long as the interpolation function shape can be uniquely determined, and the user can easily understand the coordinates. For example, when the interpolation function is interpolated by an n-th order polynomial, the interpolation function shape can be uniquely determined by finding (n+1) coordinates. The coordinates at the start time of the interpolation function and those at the end time are indicated by the coordinates of the knot 162. For this reason, when (n−1) coordinates other than these coordinates are indicated as the control points 163, the interpolation function shape can be uniquely determined.

The method of setting the coordinate positions of the (n−1) control points 163 can be changed in various ways. If the interval between the control points 163 is too small, the user can hardly recognize them, and also, it is difficult to operate them. Hence, the control points 163 may be arranged by, e.g., equally dividing the interval from the start time to the end time.

For example, assume that the time of a frame (to be referred to as a key frame hereinafter) having a given knot is t1, and the time of the next key frame is t2. The representative point trajectory from t1 to t2 is represented by $(X, Y, \text{time}) = (fx(t), fy(t), t)$ where fx(t) and fy(t) are n-th order polynomials of the time t. At this time, the coordinates of the knots 162 in the two key frames are $(fx(t_1), fy(t_1), t_1)$ and $(fx(t_2), fy(t_2), t_2)$.

Between these two knots, (n−1) control points 163 must be present. When their coordinates are determined by equally dividing the interval from t1 to t2, the coordinates of the control points 163 are $(fx((t_2-t_1) \times i/n + t_1), fy((t_2-t_1) \times i/n + t_1), (t_2-t_1) \times i/n + t_1)$ i=0, 1, ... n−1

Instead of equally dividing the time period, for example, the control points 163 may be arranged densely at a curve portion with a large change.

The number of control points 163 to be arranged may be more than (n+1) that uniquely determines the interpolation function shape. In this case, for example, (n+1) control points for uniquely determining the interpolation function shape after correction may be selected by the user, or selected on the system side (all the control points 163 more than the (n+1) control points 163 displayed may be used as the control points 163 for uniquely determining the interpolation function shape after correction).

The time of the control point 163 may match the time of the frame or may be set independently of the time of the frame. In the former case, for example, the time of the control point 163 is calculated or designated in advance in accordance with a predetermined algorithm. When the calculated or designated time of the control point 163 does not match the time of the frame, a frame time close to the calculated or designated control point time is defined as the time of the control point 163.

As video information 164, the image information of a video related to the spatiotemporal locator is displayed. For example, the images of all or arbitrary frames of the video are displayed on planes which are perpendicular to the time axis in the 3D space and located at the positions of the times of the frames to be displayed. Frames to be displayed, e.g., every few frames or only frames having knots, may be determined on the system side in accordance with a predetermined standard. Alternatively, the method of selecting frames to be displayed may be appropriately designated by the user. At least frames which have knot coordinates included in the target to be displayed and the same times as those of the control points 163 may be displayed.

Instead of displaying frame images on planes perpendicular to the time axis in the 3D space, the video information may be regarded as voxel information of (X, Y, time), and a sectional view on an arbitrary plane may be displayed. For example, when the sectional view of an (X, time) plane or (Y, time) plane is displayed, the temporal movement of the video can easily be known. In displaying arbitrary sectional views as well, sectional views to be displayed may be determined on the system side or designated by the user.

When the video information 164 is displayed in this way, the spatiotemporal region can easily be edited while referring to the objects in the video. For example, when the region information of an object in a video is to be corrected/input as the spatiotemporal locator, the region information of the object can be accurately extracted by displaying the video information 164 in the above-described way.

The video information 164 may be displayed without any processing. Alternatively, the video information may be displayed after certain processing. For example, a frame image may be made transparent or translucent, painted with a designated color, displayed with a different luminance or resolution, displayed as a monochromatic image, displayed with a different resolution, or displayed after mosaicing or other image processing.

In addition, whether processing is to be executed, or if processing is to be executed, the contents of processing (e.g., the degree of translucency, painting color, luminance, resolution, and the like) may be separately set for the inside and outside of an approximate figure representing an object region in the frame of video data.

In addition, hemming may be done in accordance with the shape of the approximate figure representing the object region in the frame so as to display the shape of the region in the frame.

A plurality of image processing operations may be combined.

For example, when a number of frame images are simultaneously displayed on the display window, the number of displayed images is large, and an image may be hidden behind another image. In this case, the hidden image can easily be referred to by making the frame images translucent. In addition, when the outer portions of regions are made transparent, images other than the spatiotemporal regions are not displayed. For this reason, the spatiotemporal region shapes can easily be recognized.

Furthermore, for example, the spatiotemporal locator can be used, in watching a video, to execute special processing for part of the video and play back it. If an object that the user does not want to see or show is contained in a video, the spatiotemporal locator can be used to mosaic the object or change its hue to ease the discomfort. As described above, in, e.g., editing a region for special processing of a video, the same special processing as that for the video to be watched is executed for the video information 164 whereby the spatiotemporal locator can be edited while referring to the manner the video is displayed.

Figure 10:
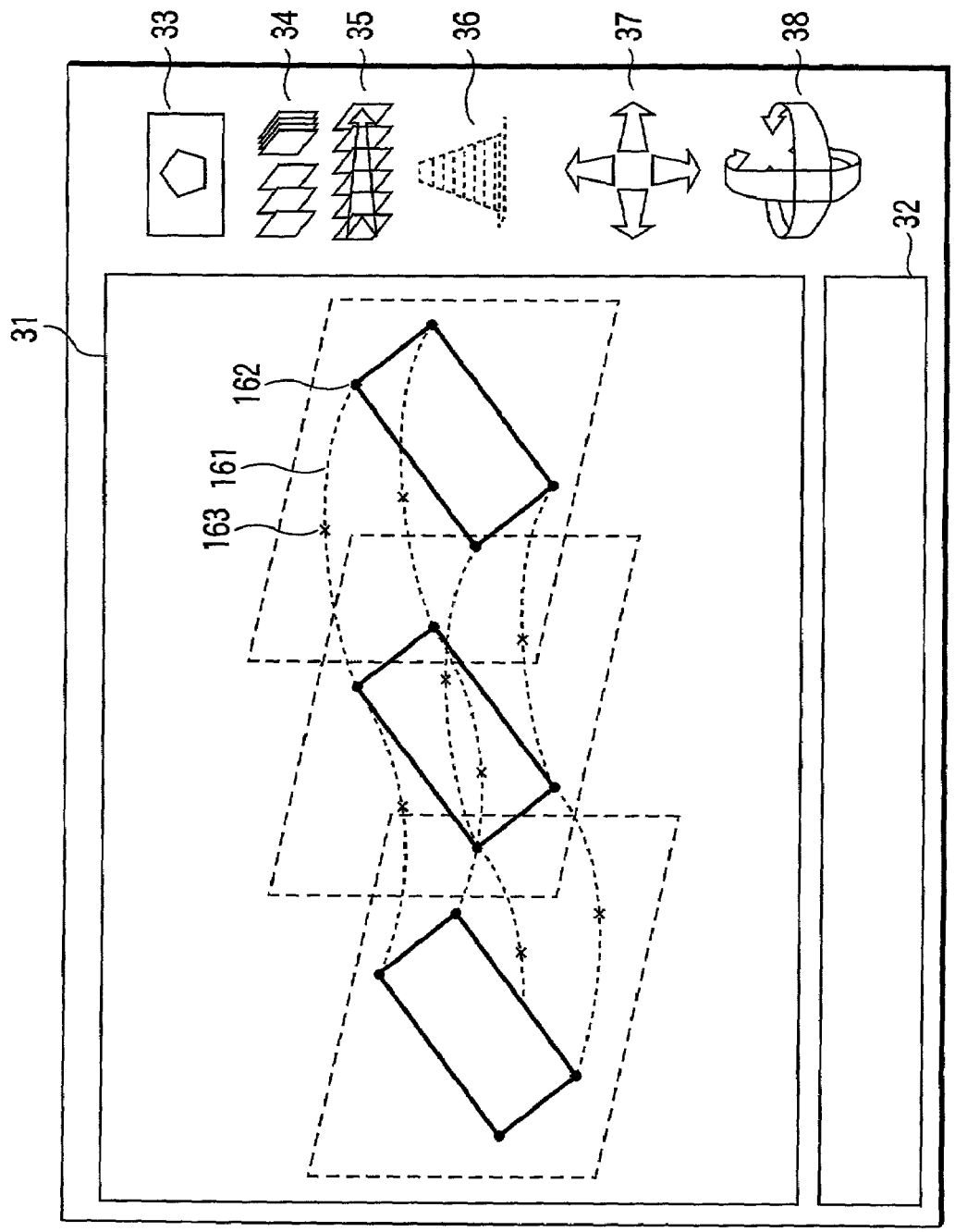
FIG. 10 is a view showing a user interface according to the embodiment of the present invention.

FIG. 10 shows the window of a graphical user interface (GUI) which projects and displays the spatiotemporal locator and video information as 3D information on a 2D plane.

As shown in FIG. 10, this GUI has a 3D space projecting section 31, status display section 32, image special display icon 33, image display density icon 34, image display position icon 35, zoom icon 36, view object point icon 37, and viewpoint icon 38.

The 3D space projecting section 31 displays an image that is obtained by displaying the spatiotemporal locator shown in FIG. 9 in the 3D space and projecting the image to a 2D plane by a suitable projecting method.

In the status display section 32, information of a spatiotemporal region or video is displayed. When the knot 162 or the control point 163 is selected, its coordinate information is displayed. If the information in the status display section 32 is rewritten by the input device 4, the spatiotemporal locator is also rewritten.

The image special display icon 33 is used to select a processing method (e.g., a method of making the inside or outside of a region translucent or transparent or executing special processing) for the video information 164 to be displayed. Any interface that allows the user to change the processing method can be used for this icon. For example, a new dialogue box may be displayed to cause the user to select a method. Alternatively, the display method may be changed every time the user presses the icon.

The image display density icon 34 and image display position icon 35 are used by the user to designate frame images to be displayed in displaying the video information 164. Every predetermined number of frames to be displayed are designated using the image display density icon 34. The position of the first frame to be displayed is designed using the image display position icon 35. When the first frame to be displayed is the h-th frame, and frames are to be displayed every i frames, h-th frame, (h+1)-th frame, (h+(i×2))-th frame, are displayed.

The image display density icon 34 and image display position icon 35 can employ any other setting methods capable of setting frames to be displayed.

The zoom icon 36, view object point icon 37, and viewpoint icon 38 are used to set how to project an image from the 3D space to the 2D plane in displaying it in the 3D space projecting section 31. The viewing direction in the 3D space is set by the viewpoint icon 38. The viewpoint in the 3D space is set by the view object point icon 37. The view angle in the 3D space is set by the zoom icon 36. Any interface arrangement other than that shown in FIG. 10 can be used as long as it can designate projection parameters.

Correction of the spatiotemporal locator will be described next.

As described above, the user operates the knot 162 or control point 163 of the representative point trajectory 161 displayed on the GUI, thereby inputting an instruction for correcting the spatiotemporal locator.

Examples of basic correction operations are as follows.

(1) Movement of one control point 163 (movement in the X, Y, and time axis directions).

(2) Movement of one knot 162 without changing the position in the time axis direction (movement in the X and Y directions).

(3) Movement of a key frame in the time axis direction (movement of all the knots 162 in the frame).

(4) Correction with an increase or decrease in order of the approximate function of a representative point trajectory (e.g., addition or delete of the control point 163).

(5) Addition or delete of a key frame (knot) (i.e., separation or integration of approximate intervals).

A representative point trajectory is uniquely determined by the coordinates of two adjacent knots 162 and a predetermined number of control points 163. Hence, when the knot 162 is added or deleted, as in correction (5), the number of knots of the representative point trajectory can be changed. When the coordinate positions of the knot 162 are changed in the time axis direction, as in correction (3), the knot time can be changed.

When the control point 163 is added or deleted, as in correction (4), the order of the interpolation function can be changed. For example, when the interpolation function is interpolated by a quadratic function, and a new control point 163 is added between knots between which one control point 163 is displayed, the interpolation can be changed to cubic function interpolation.

When the knot 162 or control point 163 is moved in the X and Y directions, as in correction (1) or (2), the interpolation function shape of the representative point trajectory can be changed. As described above, when the knot 162 or control point 163 is added or deleted, or its coordinate positions are changed, the representative point trajectory shape can be arbitrarily changed.

When a knot of a given representative point is moved in the time axis direction, it may be regarded that the knots of the remaining representative points, which have the same time information as that of the moved knot, have also undergone the same correction. When a knot is added or deleted for a given representative point, it may be regarded that knots having the same time information as that of the added or deleted knot are added or deleted for the remaining representative points. However, in the spatiotemporal locator whose data structure allows representative points to have different knot times, it may be unnecessary to regard that the same correction has been executed for the remaining representative points.

When an instruction for correcting the spatiotemporal locator is input by the user, a range of the spatiotemporal locator that should be affected by the correction is specified in the 3D space. The spatiotemporal locator in the corresponding portion is calculated to obtain a corrected spatiotemporal locator.

For example, in the correction (1), of the trajectory data 105 (FIG. 5) of the X- and Y-coordinates of a corresponding representative point, the polynomial coefficient (155 in FIG. 6) in the approximate interval including the corrected control point is affected by the correction.

For example, in the correction (2), when a knot is moved in the X-Y plane, two adjacent approximate intervals including the corrected knot are affected by the correction. Of the trajectory data 105 (FIG. 5) of the X- and Y-coordinates of a corresponding representative point, the polynomial coefficient (155 in FIG. 6) in each approximate interval including the corrected knot is affected by the correction.

For example, in the correction (3), when a knot is moved in the time axis direction, two adjacent approximate intervals including that knot are affected by the correction. Correction of the knot time 153 shown in FIG. 6 is added to the correction (2).

For example, in the correction (4), of the trajectory data 105 (FIG. 5) of the X- and Y-coordinates of a corresponding representative point, the polynomial order (154 in FIG. 6) and polynomial coefficient (155 in FIG. 6) in the approximate interval including the corrected control point 163 are affected by the correction.

In the corrections (1) to (4), the spatiotemporal locator editing device 5 obtains a representative point trajectory (or the parameter of an approximate function corresponding to the representative point trajectory) specified by the corrected knots 162 and control point 163 and corrects the trajectory data of corresponding X- and Y-coordinates.

For example, in the correction (5), when a knot is added, of the trajectory data 105 (FIG. 5) of the X- and Y-coordinates of a corresponding representative point, the data (156 in FIG. 6) of the approximate interval to which the new knot has been added is affected by the correction. The approximate interval is divided to increase the number of data (156 in FIG. 6) of approximate intervals by one. The spatiotemporal locator editing device 5 inserts the data (156 in FIG. 6) of one approximate interval before or after the data (156 in FIG. 6) of the approximate interval in the spatiotemporal locator. For each of the two approximate intervals newly generated by division, the spatiotemporal locator editing device 5 obtains a representative point trajectory (or the parameter of an approximate function corresponding to the representative point trajectory) specified by the corrected knots 162 and control point 163 and corrects the trajectory data of corresponding X- and Y-coordinates.

For example, in the correction (5), when a knot is deleted, of the trajectory data 105 (FIG. 5) of the X- and Y-coordinates of a corresponding representative point, the data (156 in FIG. 6) of two approximate intervals that included the deleted knot are affected by the correction. The approximate intervals are integrated to decrease the number of data (156 in FIG. 6) of approximate intervals by one. The spatiotemporal locator editing device 5 deletes one of the data (156 in FIG. 6) of the approximate intervals in the spatiotemporal locator. For one approximate interval newly generated by division, the spatiotemporal locator editing device 5 obtains a representative point trajectory (or the parameter of an approximate function corresponding to the representative point trajectory) specified by the corrected knots 162 and control point 163 and corrects the trajectory data of corresponding X- and Y-coordinates.

Even when a plurality of correction instructions are to be input, and then, corrections of the spatiotemporal locator are to be done collectively, corrected values of portions in the spatiotemporal locator, which should be affected by the corrections, are calculated, and trajectory data of corresponding X- and Y-coordinates are corrected in the same way as described above.

The object appearing time 102 or object disappearing time 103 shown in FIG. 5, or the number 151 of knots or first knot appearing time 152 shown in FIG. 6 is sometimes corrected depending on the contents of correction.

An instruction for correcting the shape flag 104 shown in FIG. 5 may also be input (by selecting a menu or the like).

In the GUI shown in FIG. 10, when the spatiotemporal locator is changed by adding or deleting the knot 162 or control point 163 or changing the coordinate positions, as described above, the changed spatiotemporal locator is preferably immediately displayed on the display window. When the latest spatiotemporal locator is always displayed, intuitive operation can be performed.

Adding or deleting the knot 162 or control point 163, or changing the coordinate positions can be done by any device, such as a mouse or keyboard, capable of inputting information. This coordinate position change must support movement in the 3D space. If input is done using a pointing device capable of only 2D movement, such as a normal mouse, certain 3D movement is executed by, e.g., separately performing moving operation in the X and Y directions and in the time direction. For example, if the user wants to change coordinate positions using a mouse, movement on the X-Y plane may be performed by normal mouse movement, and movement in the time direction may be performed by moving the mouse while keeping a button of the mouse or a button of a keyboard pressed. A 3D mouse may be used.

When a knot is added for a given representative point so as to add knots to the remaining representative points, the amount of subsequent correction operation can be largely reduced by estimating the region shape at the time of addition of the knot as accurately as possible. That is, when the initial shape of the spatiotemporal region represented by the added knot is predicted, the positions where knots related to the remaining representative points should be added can be predicted, and efficient operation can be executed. The initial shape is preferably predicted by estimating representative point coordinates at the time of knot addition from the representative point trajectory shape input so far.

An arbitrary method can be used to estimate representative point coordinates at knot time. For example, coordinates at knot time are calculated from a representative point trajectory function that is already defined and is closest to the knot time to be added, and the coordinates are used as the initial values of the representative point coordinates to be added. Alternatively, processing of eliminating an extreme error or making the representative point trajectory closer to the luminance edge of video information may be executed in addition to or during an estimation processing using another representative point trajectory information.

When the spatiotemporal locator is displayed in the 3D space in the above-described way, the entire spatiotemporal region shape can easily be grasped. Hence, the spatiotemporal region shape can easily be edited while referring to the relationship between preceding and succeeding frames.

In the example of the GUI shown in FIG. 10, the trajectory of temporal transition of each representative point of an approximate figure representing one object region is displayed, and the spatiotemporal locator for one approximate figure is corrected.

In the example of the GUI shown in FIG. 10, when a plurality of spatiotemporal locators are present in the display range, for example, the user may select any spatiotemporal locator. One spatiotemporal locator selected by the user so as to be edited may be displayed, and this spatiotemporal locator may be corrected.

In addition, when a plurality of spatiotemporal locators are present in the display range, the plurality of spatiotemporal locators may be simultaneously displayed. One or a plurality of spatiotemporal locators selected by the user or all the displayed spatiotemporal locators may be corrected.

When a plurality of spatiotemporal locators are simultaneously displayed, an approximate curve (and video information (e.g., a key frame)) may be displayed for each of all spatiotemporal locators. Instead, for example, an approximate curve (and video information (e.g., a key frame)) may be displayed for only one or several spatiotemporal locators selected by the user. For the remaining spatiotemporal locators, only video information (e.g., key frames) may be displayed.

When a plurality of spatiotemporal locators are to be simultaneously displayed, pieces of information related to the spatiotemporal locators may be displayed using different colors or different line types.

When a plurality of spatiotemporal locators are to be simultaneously displayed, a plurality of 3D space projecting sections 31 may be arranged, and pieces of information related to the plurality of spatiotemporal locators may be separately displayed on the 3D space projecting sections 31, instead of displaying the pieces of information related to the plurality of spatiotemporal locators on the single 3D space projecting section 31 as usual.

The GUI shown in FIG. 10 is merely an example, and various changes and modifications can be made.

Figure 11:
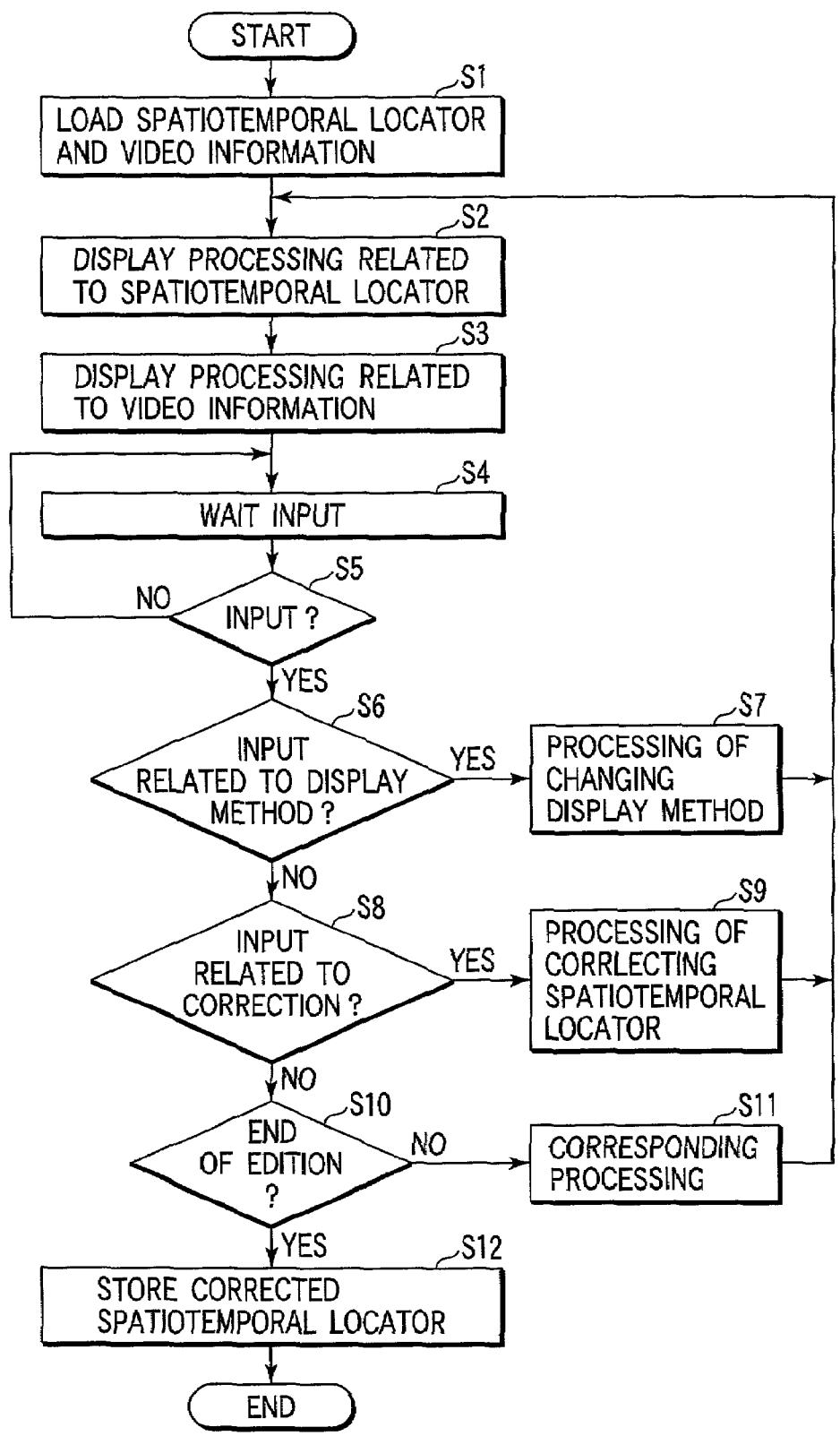
FIG. 11 is a flow chart showing a spatiotemporal locator processing procedure.

FIG. 11 shows the processing procedure of the spatiotemporal locator editing device 5 of the spatiotemporal locator processing apparatus.

First, the spatiotemporal locator is loaded from the spatiotemporal locator storage 2. Simultaneously, video information related to the spatiotemporal locator is loaded from the video storage device 1 (step S1).

Next, processing for displaying the spatiotemporal locator on the 3D space projecting section 31 by a predetermined display method is executed (step S2). For example, the external shape of an approximate figure, the representative point trajectory of an approximate figure, knot coordinates, and the control points 163 are calculated and displayed. The 3D space projecting section 31 also displays video information by a predetermined display method (step S3). That is, transparent/translucent processing or special processing and display such as mosaicing is executed as needed. Steps S2 and S3 may be executed in a reverse order or simultaneously.

An input from the user is received (steps S4 and S5).

When an input related to the display method (e.g., an input using the image special display icon 33, image display density icon 34, image display position icon 35, zoom icon 36, view object point icon 37, or viewpoint icon 38 shown in FIG. 10) is received from the user (YES in step S6), settings of the display method are changed (step S7). Step S2 and/or step S3 is executed again in accordance with the changed settings of the display method. The flow returns to the user's input wait state again (steps S4 and S5).

When an input related to correction (e.g., an input on the above-described 3D space projecting section 31 or status display section 32 shown in FIG. 10) is received from the user (YES in step S8), the spatiotemporal locator is corrected (step S9). Step S2 and/or step S3 is executed again. The flow returns to the user's input wait state again (steps S4 and S5).

If another input is received (NO in step S10), corresponding processing is executed (step S11). Step S2 and/or step S3 is executed as needed. The flow returns to the user's input wait state again (steps S4 and S5).

When, e.g., an end button is clicked on by the mouse or an end command is input to instruct the end of edition (YES in step S10), the corrected spatiotemporal locator is stored in the spatiotemporal locator storage 2 (step S12).

In spatiotemporal locator correction processing in step S9, when correction of one knot or control point is input, the corrected spatiotemporal locator may be immediately obtained and reflected on the display. Alternatively, when correction of a knot or control point is arbitrarily repeated (at this time, only the movement of the knot or control point is reflected on the display), and then, an input representing decision is done, the corrected spatiotemporal locator may be obtained collectively, and the corrected curve of the representative point trajectory and the like may be reflected on the display.

Figure 12:
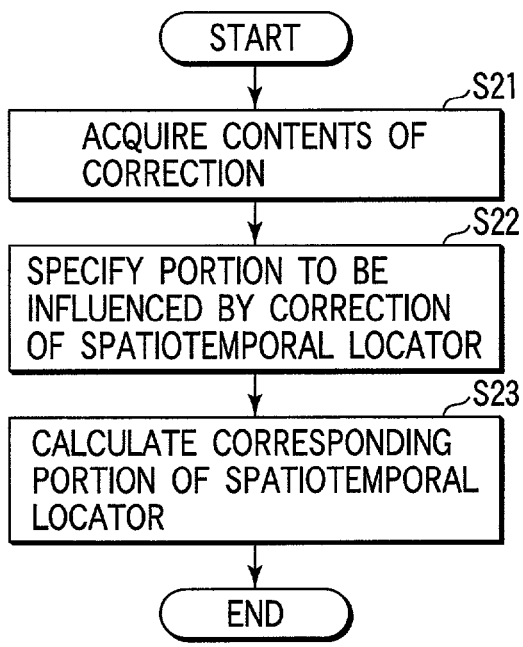
FIG. 12 is a flow chart showing a spatiotemporal locator correction processing procedure.

FIG. 12 shows a processing procedure in step S9 in the former case. In this case, the contents of a correction instruction are acquired (step S21). A portion in the spatiotemporal locator, which should be influenced by correction, is specified (step S22). A corresponding portion of the spatiotemporal locator is calculated (step S23). In this case, display based on the corrected spatiotemporal locator is done in step S2 and/or step S3.

Figure 13:
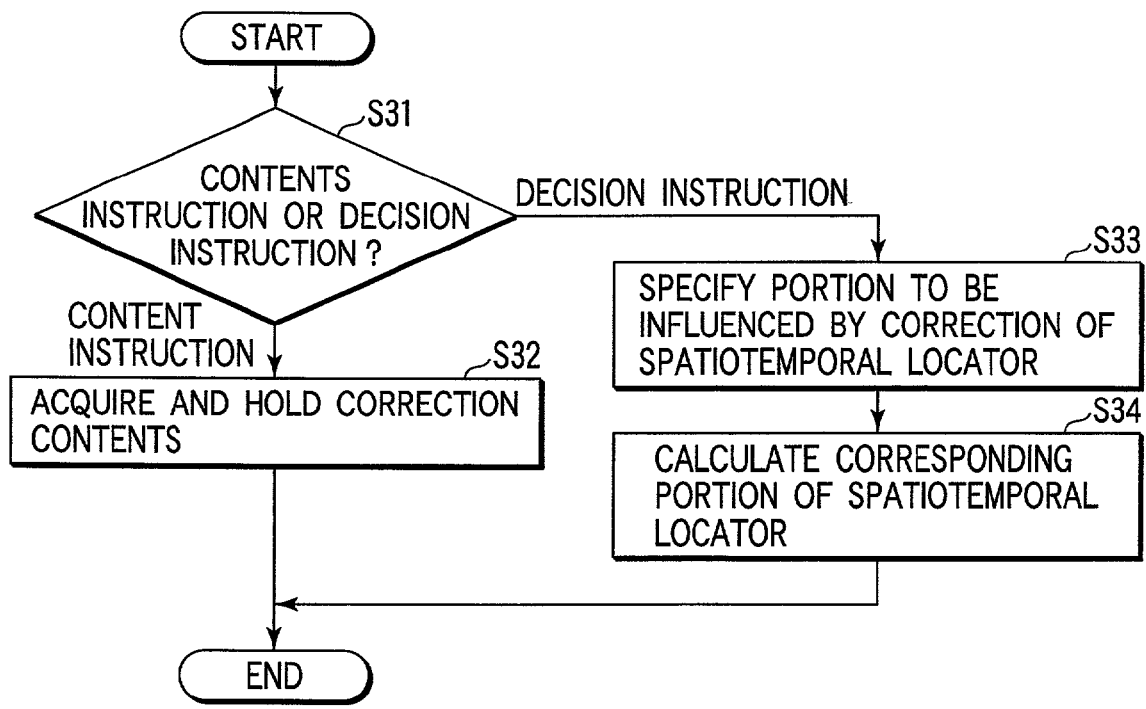
FIG. 13 is a flow chart showing another spatiotemporal locator correction processing procedure.

FIG. 13 shows a processing procedure in step S9 in the latter case. In this case, if the correction instruction contains contents of the correction (step S31), the contents of the correction are acquired and held (step S32). If the correction instruction contains a decision on correction (step S31), a portion in the spatiotemporal locator, which should be influenced by the correction, is specified based on the all correction contents held (step S33). A corresponding portion of the spatiotemporal locator is calculated (step S34). In this case, when a decision on correction is instructed, display based on the corrected spatiotemporal locator is done.

Until a decision on correction is instructed, for example, the position of a corrected knot or control point is displayed on the window. At this time, a knot or control point before correction may also be displayed to show the correction contents, or a knot or control point before correction may be erased on the window. In the former case, the knot or control point before correction is preferably displayed in a different form such that it can easily be discriminated.

In addition, for example, when the user is selecting and moving knot coordinates or control point 163 by a mouse or the like, a trajectory formed by moving the knot coordinates or control point 163 to a position may be calculated and displayed in real time in, e.g., a form different from the current trajectory.

In the above procedure, when the series of processes are ended, the corrected spatiotemporal locator is stored in the spatiotemporal locator storage 2 in step S12. Instead, the corrected spatiotemporal locator may be stored in the spatiotemporal locator storage 2 in step S9.

For correction, so-called "undo" and "redo" may be arbitrarily possible.

The above-described procedures are merely examples, and various changes and modifications can be made.

As described above, the present invention can be applied to spatiotemporal locators having various data structures.

A case wherein the present invention is applied to the spatiotemporal locator having a data structure different from those shown in FIGS. 5 and 6 will be described below.

FIG. 14 shows another example of the data structure of the spatiotemporal locator. As shown in FIG. 14, the spatiotemporal locator of this example uses a spatiotemporal region in a given frame as a reference region. The spatiotemporal locator of each frame is represented by transforming the reference region and contains an object ID 301, object appearing time 302, object disappearing time 303, reference region flag 304, reference region shape information 305, transformation form flag 306, and K trajectory data 307.

The object ID 301, object appearing time 302, and object disappearing time 303 have the same meanings as those of the object ID 101, object appearing time 102, and object disappearing time 103 in FIG. 5.

The reference region flag 304 indicates the manner a reference region shape is expressed. Since a reference region shape is expressed by, e.g., a rectangle, ellipse, or polygon, information capable of uniquely discriminating between them is described. For a polygon, information representing the number of apexes is also added to the reference region flag 304.

The reference region shape information 305 stores the reference region shape. For example, when the reference region shape is rectangular or polygonal, the coordinates of each apex are stored. When the reference region shape is elliptical, parameters such as the coordinates of each apex of a circumscribing rectangle, the central point, and the lengths of major and minor axes are stored.

The transformation form flag 306 represents the form of a transform parameter that indicates region transformation from the reference region to the spatiotemporal locator of each frame. Examples of the form of the transform parameter indicating region transformation are translation, linear transformation, and affine transformation. Information capable of uniquely discriminating between them is described.

The trajectory data 307 describes the trajectory of each transform parameter that indicates region transformation from the reference region to the spatiotemporal locator of each frame. The trajectory data 307 has, e.g., the data structure of the trajectory data shown in FIG. 6. Since a plurality of transform parameters are present in many cases, the number of trajectory data 307 described equals the number K of transform parameters. The number of trajectory data is uniquely determined by the transformation form flag 306. For example, the number of trajectory data is 2 for translation, 4 for linear transformation, and 6 for affine transformation. The order of trajectory data is determined by the meaning of the transform parameters. An example will be described below.

Assume that the trajectory data of parameters as the functions of time t are arranged in an order of $z1(t), z2(t), \ldots$ A trajectory obtained by transforming a given point $p=(px, py)$ on the reference region by region transformation is defined as $P(t)=(Px(t), Py(t))$.

1: Translation $Px(t)=px+z1(t)$ $Py(t)=py+z2(t)$

2: Linear Transformation $Px(t)=px \times z1(t)+py \times z2(t)$ $Py(t)=px \times z3(t)+py \times z4(t)$ 3: Affine Transformation $Px(t)=px \times z1(t)+py \times z2(t)+z3(t)$ $Py(t)=px \times z4(t)+py \times z5(t)+z6(t)$ When the trajectory data $z1(t), z2(t), \ldots$ of the parameters are represented by nth-order polynomials, $Px(t)$ and $Py(t)$ can also be represented by nth-order polynomials from the above equations.

In this case, the spatiotemporal locator processing apparatus has the same arrangement as that shown in FIG. 7 or 8.

Differences from the above-described arrangement in which the present invention is applied to the spatiotemporal locator having the data structures shown in FIGS. 5 and 6 will be described below.

To display the spatiotemporal locator of this example, the spatiotemporal locator editing device 5 basically has the same function as described above. However, since the data structure of the spatiotemporal locator is different, the spatiotemporal locator is displayed after transformation to a representative point trajectory from the above equations. When the user has moved the knot 162 or control point 163 on the representative point trajectory in a key frame, each transform parameter is calculated, and all representative point trajectories are changed in accordance with the changed transform parameters.

The processing procedure in this case is the same as that in FIG. 11, 12, or 13.

With this processing, even the spatiotemporal locator described from a reference region and transform parameters that indicate region transformation from the reference region to the spatiotemporal locator of the frame can be edited like the spatiotemporal locator described as the trajectory of each representative point.

The spatiotemporal locator processing apparatus may process spatiotemporal locators with a plurality of types of data structures. In this case, identification information is added to each spatiotemporal locator to identify its data structure. In processing the spatiotemporal locator, the spatiotemporal locator processing apparatus specifies the data structure by referring to the identification information and executes processing corresponding to the data structure.

Several variations of the spatiotemporal locator to which the present invention is applied will be described below.

First, the spatiotemporal locator having a data structure added with a display flag will be described.

The spatiotemporal locator containing a display flag will be described.

This spatiotemporal locator contains display flag information related to a display flag that represents, for an object in a video, whether the object (or part of the object) is visible on the window, or is hidden behind another object and is invisible.

Figures 15A, 15B, 15C:
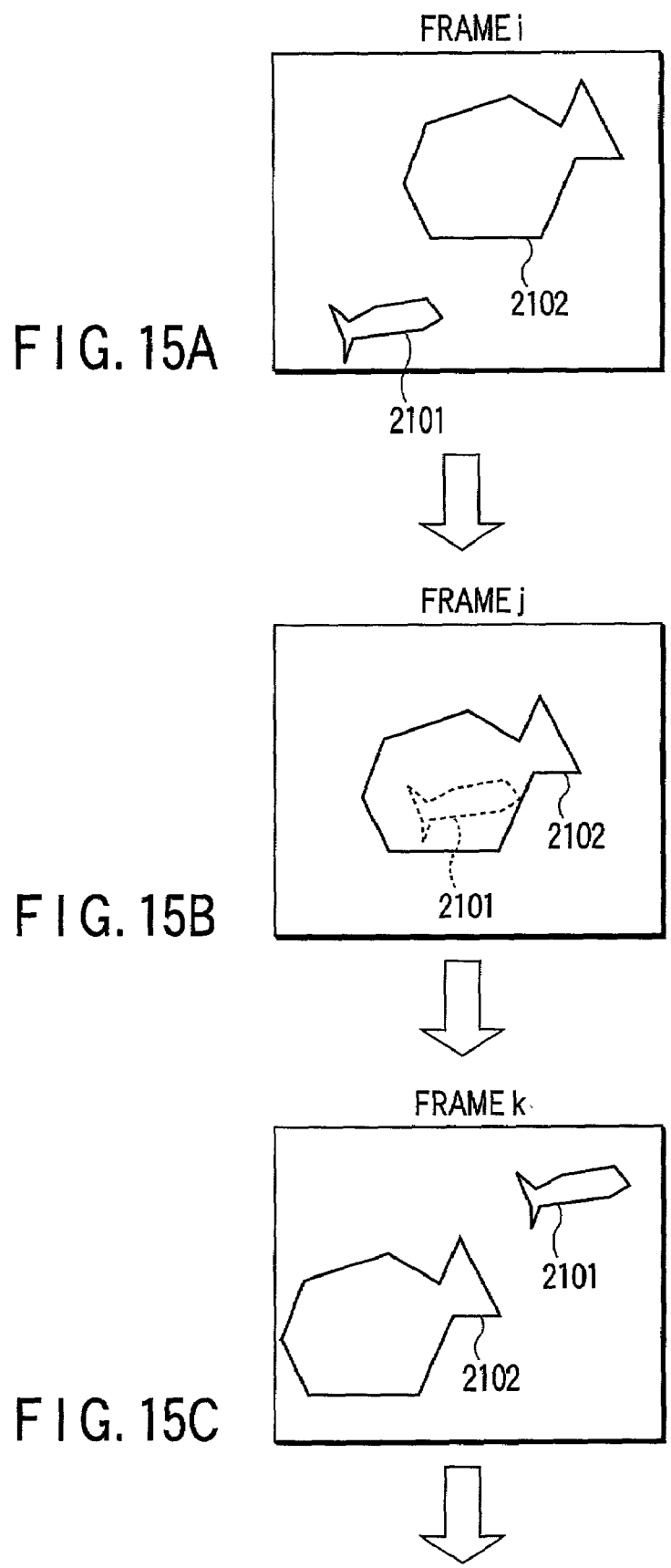
FIGS. 15A, 15B, and 15C are views for explaining a display flag.

For example, as shown in FIGS. 15A, 15B, and 15C, when a plurality of objects are present in a video, an object 2101 is often hidden behind another object 2102 and then appears again. To describe this state, display flag information is added to the spatiotemporal locator.

A display flag may be given for each target object or for each representative point of the approximate figure of a target object.

When a display flag is given for each target object, setting the display flag indicates that the object is not hidden. At the time of playback, the object is displayed. Clearing the display flag indicates that the object is hidden. At the time of playback, the object is not displayed.

When a display flag is given for each representative point of the approximate figure of a target object, and display flags at all representative points of the approximate figure of one target object are in the same state, the display flags indicate the same state as described above. If some representative points include set display flags and other include cleared display flags, the object is displayed in consideration of the state of the display flags (e.g., only corresponding part of the object is displayed).

A display flag is set between key points and is set when the representative point trajectory data of an object region is created. Key points may be arranged independently of the knots of an approximate function. However, key points may always serve as knots. For example, a key point is generated, its time may forcibly be set as a knot.

Figure 16:
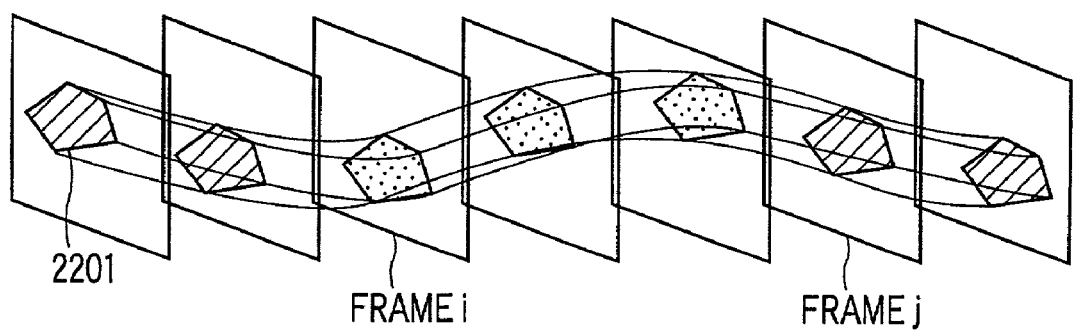
FIG. 16 is a view for explaining representative point trajectory data creation.

When a display flag is given for each target object, key points are set when an object transits from the appearing state to the hidden state or from the hidden state to the appearing state. In the example shown in FIG. 16, an object 2201 is appearing until frame i. The object is hidden from frame i to j and appears again after a frame j. In this case, key points are set in the frames i and j. Display flags from the frame i to j are set in the hidden state. The remaining display flags are set in the appearing state. This also applies to a case wherein a display flag is given for each representative point of the approximate figure of a target object.

In creating representative point trajectory data, it is created assuming that an object appears throughout the frames. If information of a representative point is unknown because the object is hidden, representative point trajectory data is created by interpolating it from known information of the representative points in the preceding and succeeding frames. After the representative point trajectory data is created, display flags are set in accordance with whether the object is appearing or hidden. Hence, an object can be expressed by a series of representative point trajectory data regardless of its appearing or hidden state.

Variations of display flag information will be described below.

Normally, a display flag is set between key points. A start time stamp and end time stamp may be added to the display flag itself. In this case, a display range or hidden range can be set independently of key points.

One object may have one display flag or a plurality of display flags independently for each representative point trajectory data. For example, when an object is expressed by a polygon and expressed by trajectory data using the apexes as representative points, the hidden state of only part of the object can be expressed by independently preparing display flags for the representative point trajectory data.

A display flag may also have an integer value as priority instead of only representing the appearing state or hidden state. When objects overlap, an object with low priority is hidden behind an object with high priority, and only the object with high priority is displayed. An object having priority "0" is always hidden independently of other objects.

In the case wherein a display flag with an integer value is set, as described above, even when objects are synthesized in a video, the problem of their hidden states can be solved. Even when a display flag is represented by an integer value, one object may have one display flag or a plurality of display flags independently of each representative point trajectory data.

Figure 17:
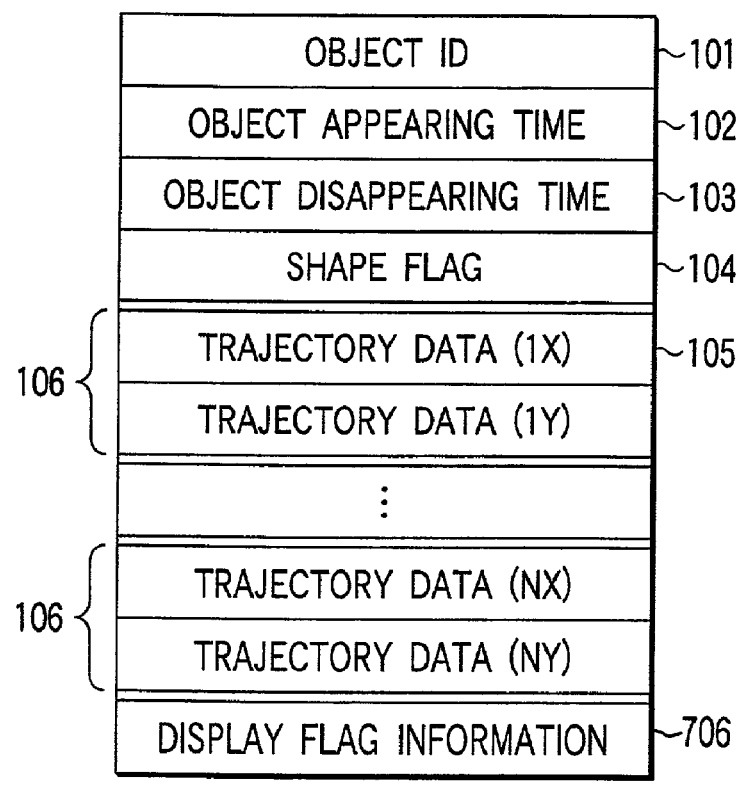
FIG. 17 is a view showing another example of the data structure of a spatiotemporal locator.
Figure 18:
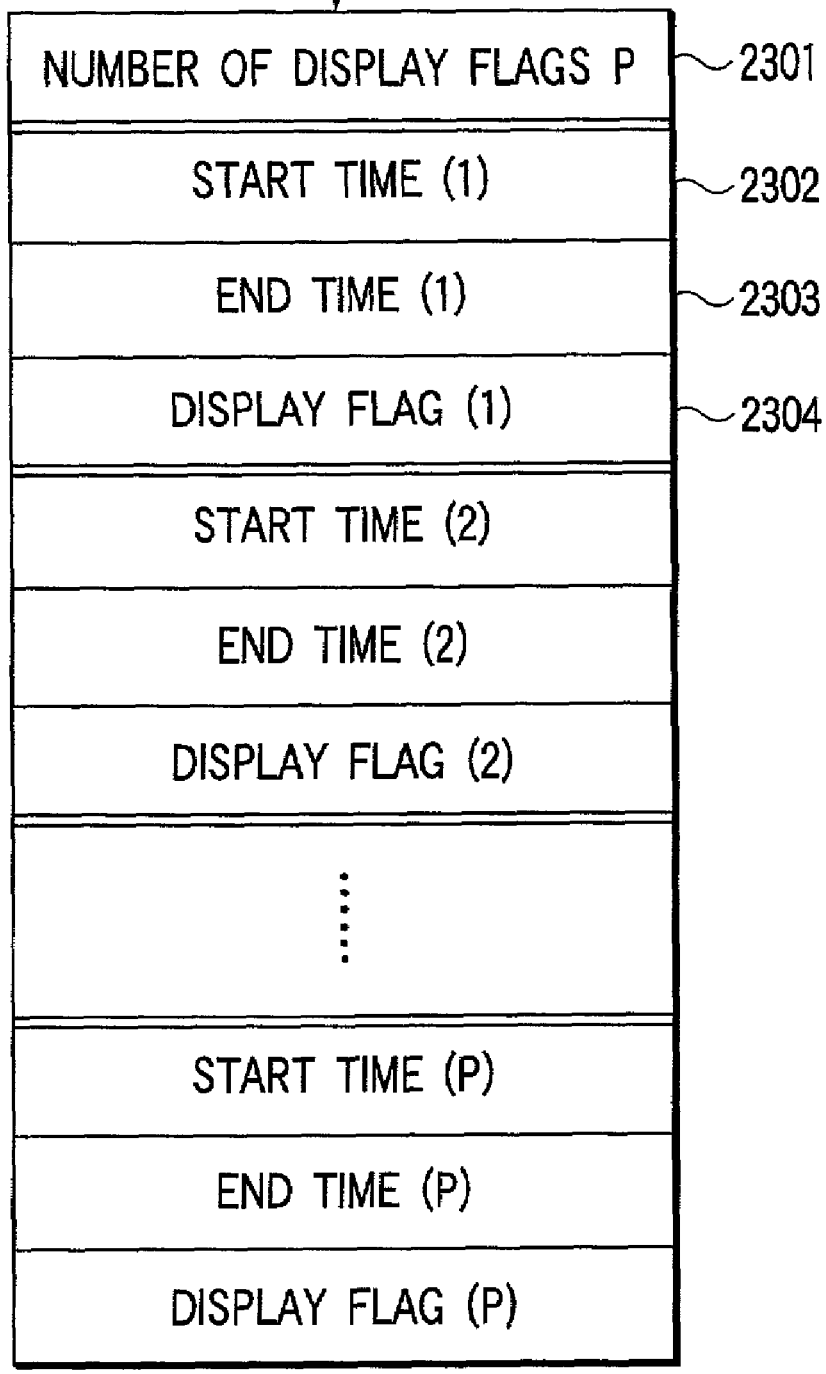
FIG. 18 is a view showing an example of the data structure of display flag information.

FIGS. 17 and 18 show another example of the spatiotemporal locator obtained by adding a display flag to the data structure shown in FIG. 5.

In the example shown in FIG. 17, when one display flag is to be added to a target object, display flag information 706 is added to the spatiotemporal locator shown in FIGS. 5 and 6.

FIG. 18 shows an example of the structure of the display flag information 706.

In this example, a start time 2302 and end time 2303 are prepared for each display flag 2304. A number P 2301 of display flags is the total number of display flags. When the start time 2302 and end time 2303 are not used, the number of display flags equals "the number of key points −1". Hence, the number P 2301 of display flags may be omitted.

The display flag 2304 records by 0 or 1 whether an object is appearing or hidden. An integer value may be used as priority.

When a display flag is added to each representative point of the approximate figure of an object, the display flag information 706 is added for, e.g., each representative point trajectory of the spatiotemporal locator.

Figure 19:
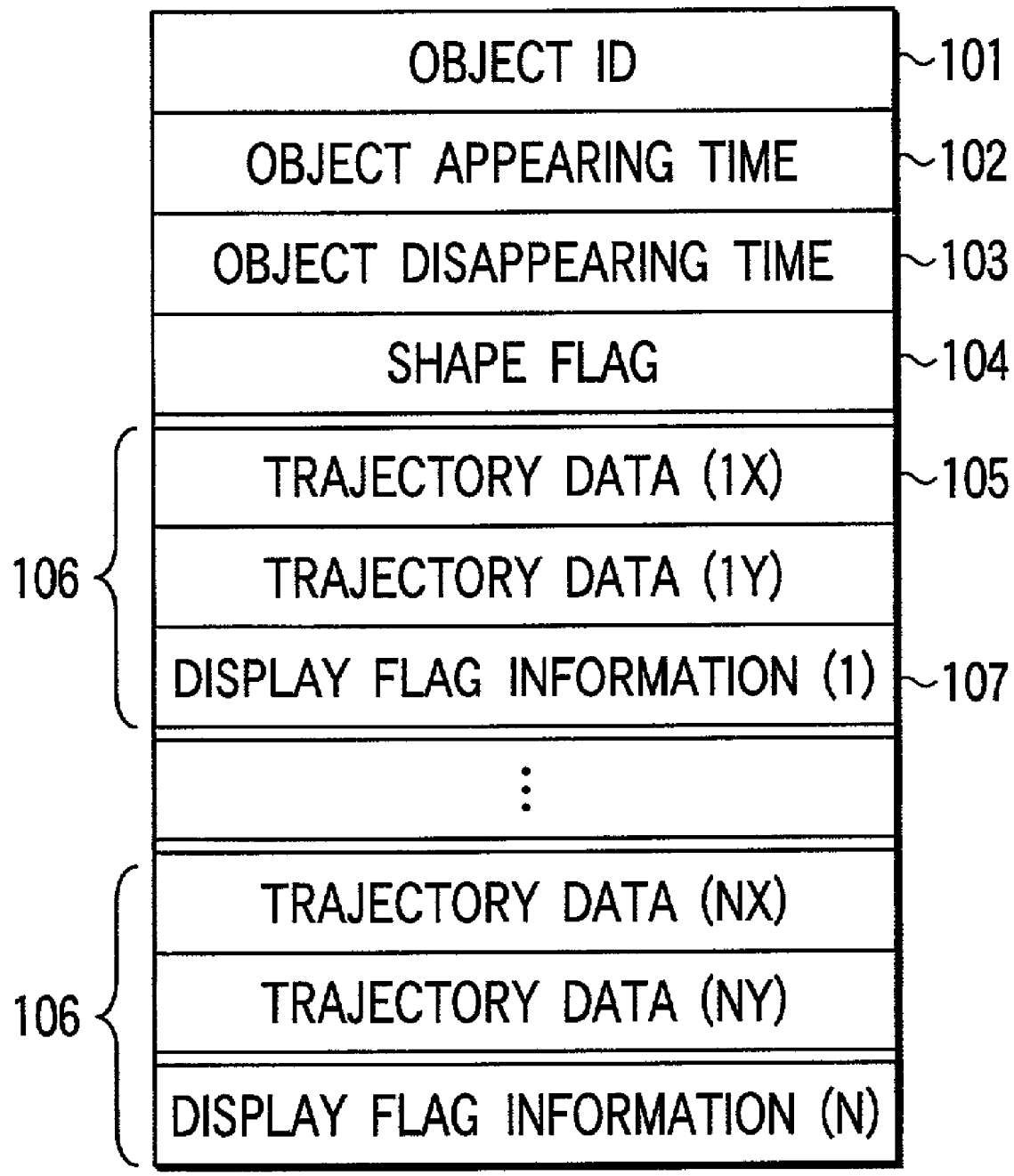
FIG. 19 is a view showing another example of the data structure of representative point trajectory data in the spatiotemporal locator.

FIG. 19 shows another example of the data structure of a representative point trajectory when display flag information is added for each representative point trajectory of the spatiotemporal locator shown in FIG. 5. The structure of a display flag 107 shown in FIG. 19 is the same as that of the display flag 706 shown in FIG. 18.

Assume that the user has corrected the spatiotemporal locator by moving, adding, or deleting the knot 162 or control point 163. When the spatiotemporal locator editing device 5 corrects the spatiotemporal locator, an object that exists in a given frame of a video without being hidden by any other object before correction may be hidden after correction. Conversely, an object that is hidden by another object before correction may appear after correction. In such a case, the spatiotemporal locator editing device 5 determines the content of flag information to be assigned by, e.g., referring to and comparing the flag information of each spatiotemporal locator before and after the frame, and also corrects the spatiotemporal locator. In some cases, only the content of the display flag 2304 shown in FIG. 18 may be updated. Otherwise, the interval between the start and end times shown in FIG. 18 may be divided. The content of flag information to be assigned may be determined not only by the spatiotemporal locator editing device 5 but also by the user.

The user may directly correct flag information using the status display section 32 or the like.

When the spatiotemporal locator is displayed on the GUI window, the contents of the display flag information may also be presented to the user. For example, the outer frames of approximate figures, the internal portions of approximate figures, or representative points of approximate figures may be displayed using different colors, luminance levels, or resolutions in accordance with the contents of display flag information so as to identify them.

The spatiotemporal locator containing information (to be referred to as "object passing range information" hereinafter) representing a range on a window through which an object that has appeared and then disappeared in a video has passed will be described next.

Object passing range information will be described first.

When an object is represented by representative point trajectory data of an object region, one object is normally expressed using a plurality of trajectory data. For a user who wants to search for an object that has passed through a designated point, it is convenient if an object passing range can be expressed without calculating the object region from the plurality of trajectory data.

To do this, in the spatiotemporal locator, object passing range information representing a minimum rectangle or polygon that surrounds the entire trajectory of an object is generated and added to the spatiotemporal locator.

When a rectangle is used, a tilted rectangle may be used, or a rectangle that is not tilted may be used. When a tilted rectangle is used, the trajectory of an object region can be approximated with minimum error. When a rectangle that is not tilted is used, the parameters of the rectangle can easily be calculated.

Figure 20A:
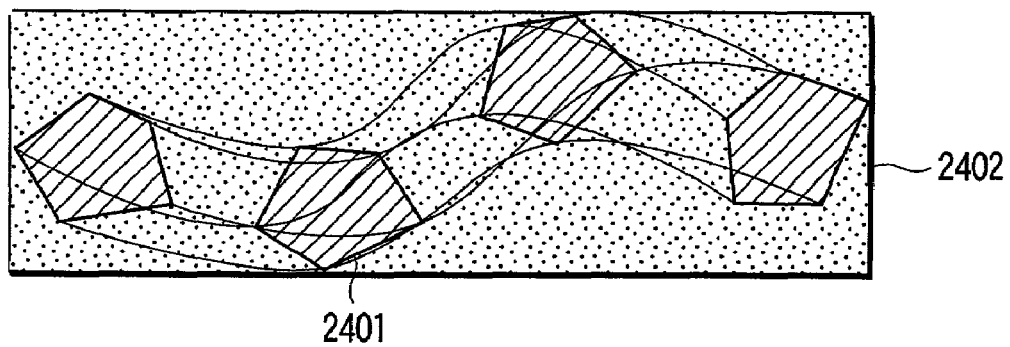
FIGS. 20A, 20B, and 20C are views for explaining object passing range information.

Referring to FIG. 20A, reference numeral 2402 denotes object passing range information obtained by approximating the trajectory region of an object 2401 by a rectangle that is not tilted.

Figure 20B:
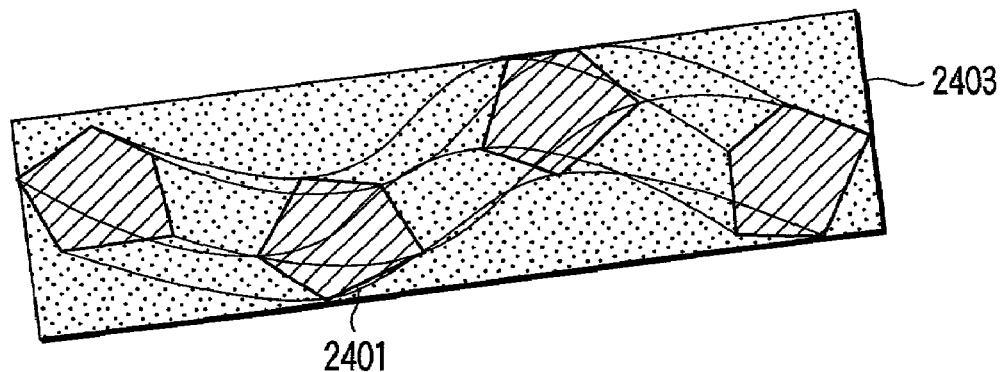

Referring to FIG. 20B, reference numeral 2403 denotes object passing range information obtained by approximating the trajectory region of the object 2401 by a tilted rectangle.

Figure 20C:
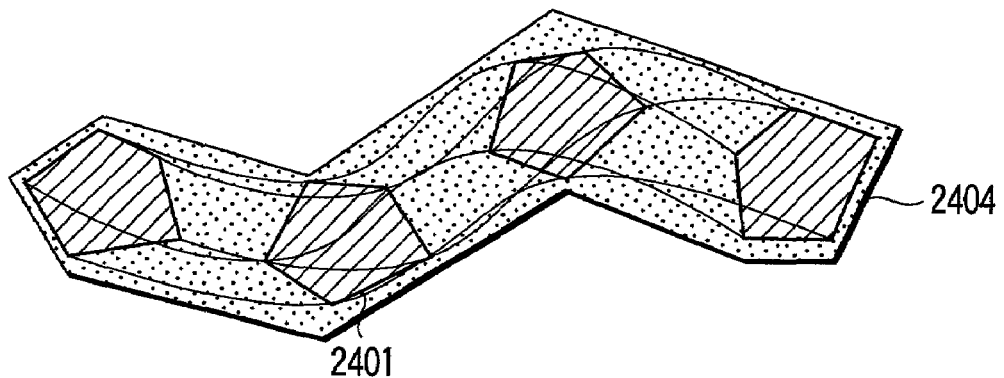

Referring to FIG. 20C, reference numeral 2404 denotes object passing range information obtained by approximating the trajectory region of the object 2401 by a polygon.

To calculate a minimum rectangle or polygon that surrounds the entire trajectory of an object, a region in each frame is obtained. Then, the OR of the regions over all the frames is calculated. The region of the obtained OR is approximated by a minimum rectangle or polygon.

In calculating a minimum rectangle or polygon that surrounds the entire trajectory of an object, the region of the OR between a minimum rectangle or polygon that surrounds the entire trajectory of the object related to an already calculated frame and the object region in a frame to be newly added may be approximated by a minimum rectangle or polygon.

In calculating a minimum rectangle or polygon that surrounds the entire trajectory of an object, a minimum rectangle or polygon that surrounds the trajectory of each representative point may be calculated, and a minimum rectangle or polygon that surrounds the OR of rectangular or polygonal regions obtained for all trajectories may be calculated.

Figure 21:
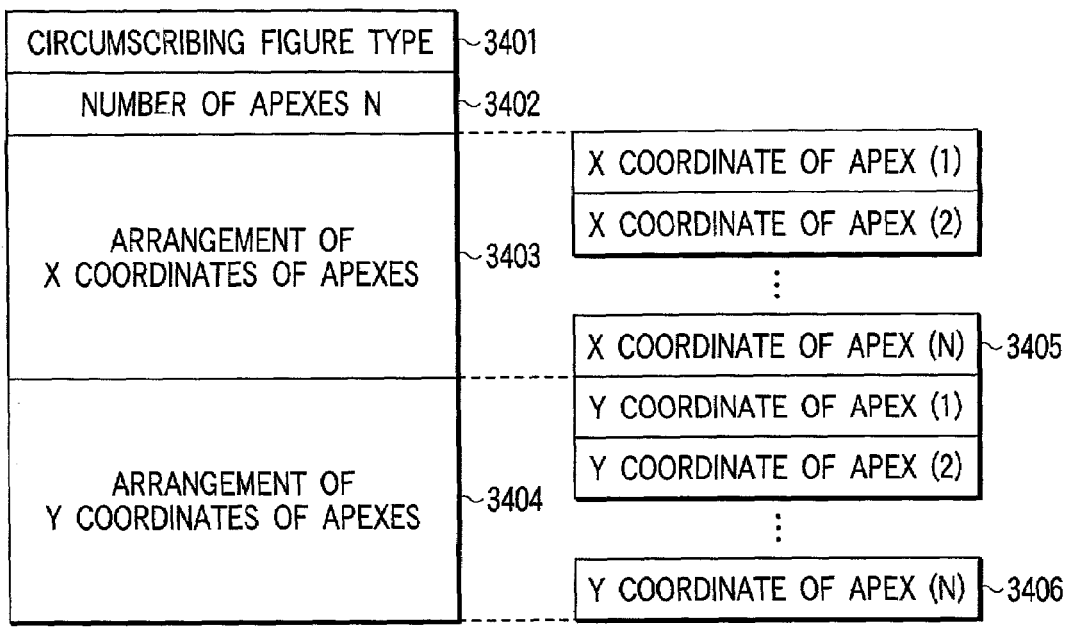
FIG. 21 is a view showing an example of the data structure of object passing range information.
Figure 22:
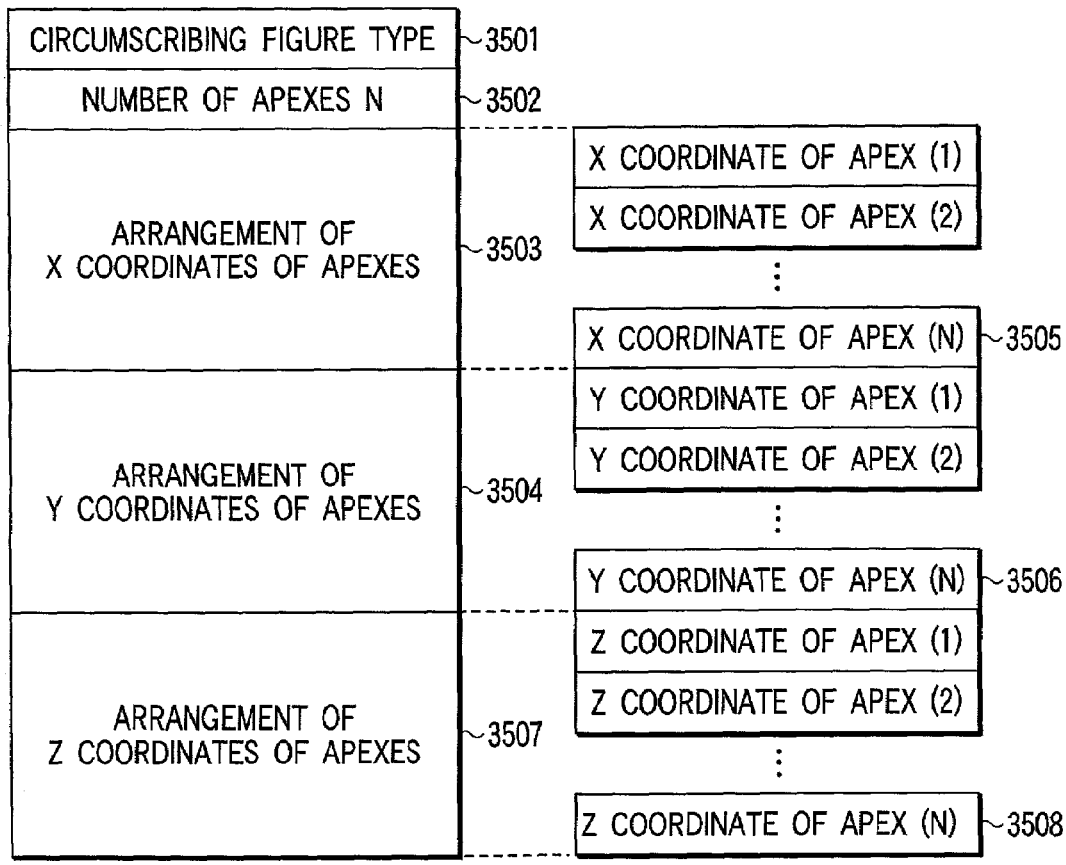
FIG. 22 is a view showing another example of the data structure of object passing range information.

FIG. 21 shows a description example of object passing range information accompanying object region information. A circumscribing figure type 3401 indicates the type of a circumscribing figure. For example, "0" indicates the rectangle shown in FIG. 20A, which is not tilted, "1" indicates the tilted rectangle shown in FIG. 20B, and "2" indicates the polygon shown in FIG. 20C. If the circumscribing figure type is "0", the number N of apexes is 2. If the circumscribing figure type is "1", the number N of apexes is 3. If the circumscribing figure type is "2", the number N of apexes is arbitrary. When an object has a depth, a 3D circumscribing figure can be considered by adding trajectory information of the depth. In this case, pieces of information 3507 and 3508 related to depth information Z are added, as shown in FIG. 22.

In this way, when the information of a minimum rectangle or polygon that surrounds the entire trajectory of an object is added, an object passing range can be efficiently expressed. Hence, it can easily be determined whether an object would pass through a given coordinate point.

In this case, object passing range information is also displayed on the GUI window. Object passing range information may be displayed, e.g., for all frames that display an approximate figure or for only one or a plurality of selected frames.

Assume that the user has corrected the spatiotemporal locator by moving, adding, or deleting the knot 162 or control point 163. When the spatiotemporal locator editing device 5 corrects the spatiotemporal locator, object passing range information may change. In such a case, the spatiotemporal locator editing device 5 also corrects the object passing range information.

In addition, the user may directly correct the figure of displayed object passing range information. In this case, the spatiotemporal locator editing device 5 corrects the object passing range information as the user has corrected it.

The spatiotemporal locator for mosaicing will be described next.

Mosaicing is a method of pasting a plurality of images that are imaged with their imaging ranges partially overlapping each other, thereby synthesizing an image in a wide range. A thus synthesized image is also called a panoramic image. A plurality of methods of creating a panoramic image from a plurality of images by mosaicing have been proposed (e.g., M. Irani, P. Anandan, "Video Indexing Based on Mosaic Representations", Proceedings of the IEEE, Vol. 86, No. 5, pp. 905–921, May 1998).

For this spatiotemporal locator, instead of approximating based on position data of a representative point of the approximate figure of an object region in each frame, as described above, approximation is executed based on position data of a representative point of the approximate figure of each object region in a panoramic image.

FIGS. 23A and 23B are views for explaining this method.

A panoramic image itself forms an image. The coordinates of each pixel in each still image before synthesis are converted using a certain reference point (e.g., a point at the lower left corner of each frame) in a panoramic image as an origin. Hence, the representative points of the approximate figures of object regions in the respective still images serve as a sequence of X- and Y-coordinates on the coordinate system of the panoramic image. Here, the sequence of X- and Y-coordinates of the representative points of the approximate figures of object regions in the respective still images is approximated by a function in the same way as described above. At this time, for example, a difference vector is calculated in one still image or between still images. The sequence of difference vectors is approximated by a function.

First, a panoramic image is created from a plurality of input still images. These input images correspond to images 2000 to 2005 in FIG. 23A, which are obtained by imaged a moving object while moving a camera. Reference numeral 2006 denotes an object in an image. The same object is imaged in the images 2000 to 2005. These images are often still images obtained by imaging continuous frames or imaging ranges in a moving image while moving the camera such that they overlap each other. However, any other input image from which a panoramic image can be formed can be used.

A panoramic image 2007 in FIG. 23B is synthesized from these input images.

Next, individual object regions that are present in the synthesized panoramic image are approximated by figures. Panoramic image creation and figure approximation of object regions may be executed in a reverse order. However, depending on transformation in synthesizing the panoramic image, the approximate figure type of the object regions may be required. For example, an object region is approximated by a rectangle, and a panoramic image is synthesized by affine transformation, the object region after synthesis is not always rectangular. In this case, the panoramic image is created first. Alternatively, correction is performed after transformation of panoramic image synthesis.

The trajectory of each representative point or feature point of the obtained approximate figure of the object region is approximated by a function. The trajectory of the object region is obtained by defining an object region as a reference and calculating the change amount of each object region from the reference object region. For example, referring to FIG. 23B, an object region 2008 of the first input image is defined as a reference. Changes of subsequent object regions are obtained as a trajectory 2009. In this example, the center of gravity of an object region is set as a representative point. However, a representative point of another approximate figure such as a rectangle or ellipse may be used. Alternatively, another feature point may be used as a representative point.

To obtain a change amount from the reference point, the difference with respect to the reference point may be used. Alternatively, the difference from an immediately preceding object region may be used. These change amounts can also be approximated by a function. Instead of using movement of a representative point or feature point, a movement model such as translation/rotation or affine transformation may be used to approximate a change from the reference point, and the movement of the object may be described as the trajectory of the transformation function. In this case as well, the trajectory of the transformation function can be approximated by a function.

Next, the parameter of the function that approximates the obtained trajectory is described in accordance with the above-described data structure format.

Various parameters used when the individual images of the input images are synthesized into a panoramic image can also be described in the same manner as described above by regarding the entire input images as object regions.

Figure 24:
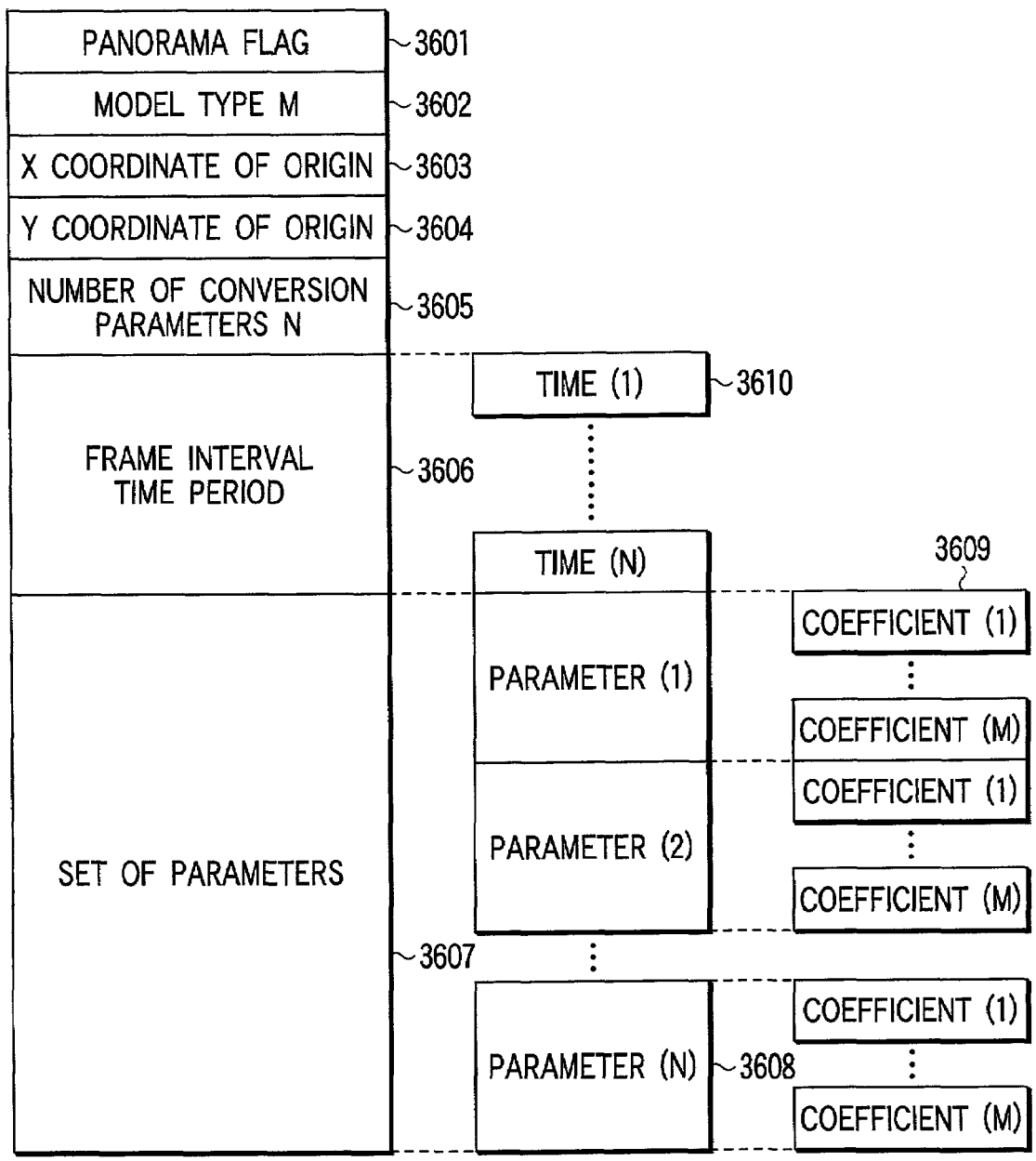
FIG. 24 is a view for explaining the object region information describing method using mosaicing.

FIG. 24 shows a description example of parameters accompanying object region information. The parameters describe the coordinate system of the created panoramic image by the coordinates of video frames used for creation and transform parameters from the video frames to the panoramic image. The origin can be set at any point. Here, assume that the coordinates on a video frame are defined by setting the origin at the lower left corner. Also assume that the vertical and horizontal lengths of frames used for mosaicing equal and are known. A panorama flag 3601 represents whether an object is described using the coordinate system of a panoramic image. When the flag is "0", a normal coordinate system is used (i.e., the origin is set at the lower left corner in all video frames). When the flag is "1", a coordinate system integrated for a panoramic image is used. A model type M 3602 indicates the type of transformation model used when each frame is transformed into a panoramic image. For example, when the model type M is "0", it represents "no transformation". When the model type M is "2", it represents "translation". When the model type M is "4"!, it represents "rotation/enlargement/reduction". When the model type M is "6", it represents "affine transformation". When the model type M is "8", it represents "perspective transformation". When the model type M is "12", it represents "secondary projective transformation". In each model, parameters equal in number to the values of the model type M are present.

1: Translation $$Vx(x, y) = a_1$$

$$Vy(x, y) = a_2$$

2: Rotation/Enlargement/Reduction $$Vx(x, y) = a_1 + a_3 + a_4 y$$

$$Vy(x, y) = a_2 - a_4 + a_3 y$$

3: Affine Transformation:

$$Vx(x, y) = a_1 + a_3 + a_4 y$$

$$Vy(x, y) = a_2 30\ a_5 + a_6 y$$

4: Perspective Transformation $$Vx(x, y) = (a_1 + a_3 + a_4 y)/(1 + a_7 + a_8 y)$$

$$Vy(x, y) = (a_2 + a_5 + a_6 y)/(1 + a_7 + a_8 y)$$

5: Secondary Projective Transformation $$Vx(x, y)=a_1+a_3+a_4y+a_7xy+a_9x^2+a_{10}y^2$$

$$Vy(x, y)=a_2+a_5+a_6y+a_8xy+a_{11}x^2+a_{12}y^2$$

An origin for transformation is given by an X coordinate of origin 3603 and Y coordinate of origin 3604. These origins are represented by the coordinate system of the original video frame. Such origins for transformation are given to reduce error that may occur in transformation. A number N 3605 of transform parameters equals the number N of frames used for a panoramic image. A transform parameter is necessary for each frame. A frame interval time period 3606 is a time period from an initial frame. A set of parameters 3607 describes M parameters in accordance with the transformation model type. The trajectory of an object in each frame is also transformed and described using the set of parameters.

With the above method, when a camera images an object region while tracing it, a panoramic image is created by mosaicing, i.e., by executing image transformation to paste and connect continuous frames. Object region information on the created image is described. Hence, even when the camera is moving, the object region information can be uniquely described on a coordinate system using a given point on the mosaicing image as a starting point.

In this case, the spatiotemporal locator may be displayed by 3D display on a GUI window as described above. Instead, a panoramic image may be displayed as in FIG. 23B, and its spatiotemporal locator may be displayed.

When the user has corrected the knot 162 or control point 163, the spatiotemporal locator editing device 5 corrects a corresponding spatiotemporal locator.

As described above, according to this embodiment, in the spatiotemporal locator processing method of correcting the spatiotemporal locator capable of specifying the trajectory of a representative point of an approximate figure representing an arbitrary region in order to represent a transition of the region over a plurality of frames in video data, the trajectory of the representative point is obtained based on the spatiotemporal locator, the obtained trajectory of the representative point is displayed on a window, input of a correction instruction for the trajectory displayed on the window is received, and the spatiotemporal locator is corrected based on the correction instruction.

With this method, a function of displaying the trajectory of the representative point in a 3D space with X, Y, and time axes and causing the user to manipulate the displayed trajectory of the representative point in the 3D space is imparted, and the trajectory of each representative point is manipulated in the 3D space, thereby inputting and correcting the spatiotemporal locator.

More specifically, the trajectory of the corrected representative point is obtained based on the corrected spatiotemporal locator, the trajectory of the corrected representative point is displayed on the window, input of another correction instruction for the trajectory of the corrected representative point displayed on the window is received, and the corrected spatiotemporal locator is corrected based on the another correction instruction.

In addition, displaying the trajectory of the representative point on the window is displaying a correction instructing point at a predetermined portion on the trajectory of the representative point displayed on the window, and receiving input of the correction instruction is receiving input of a correction instruction for the correction instructing point.

With this arrangement, when the point in the 3D space is manipulated, the spatiotemporal locator expressed by the trajectory of the representative point interpolated by a function can be input or corrected.

More specifically, receiving input of the correction instruction is one of receiving input of a movement instruction for the correction instructing point in an arbitrary direction, receiving input of an addition instruction of a new correction instructing point, and receiving input of a delete instruction of the existing correction instructing point.

The trajectory is a function approximation of a representative point sequence. Displaying the correction instructing point is displaying a number of correction instructing points that uniquely determine the interpolation function. Correcting the spatiotemporal locator is one of correcting the spatiotemporal locator by a position of the moved or added correction instructing point and correcting the spatiotemporal locator by a position of a correction instructing point near the deleted correction instructing point.

The trajectory is a function approximation of a representative point sequence, and an approximate interval is formed from small intervals divided by knots. Receiving input of the correction instruction is one of receiving input of a movement instruction for the knot of the approximate interval, receiving input of an addition instruction of the knot, and receiving input of a delete instruction of the knot. Correcting the spatiotemporal locator is correcting the spatiotemporal locator based on a small interval after the movement, addition, or delete is done.

The trajectory is a function approximation of a representative point sequence, and an approximate interval is formed from small intervals divided by knots. Receiving input of the correction instruction includes receiving input of an addition instruction of a knot of the approximate interval and estimating a shape of the approximate figure at a time of the knot added based on the spatiotemporal locator.

The trajectory is a function approximation of a representative point sequence, and an approximate interval is formed from small intervals divided by the knots. Displaying the correction instructing point is displaying a number of correction instructing points that uniquely determine the interpolation function, and displaying the point includes displaying the knot of the approximate interval and the remaining points in a discriminable display form.

Displaying the trajectory includes displaying, on the window, a predetermined frame of the video data together with the trajectory of the representative point.

Thus, it is possible to efficiently inputting/correcting a spatiotemporal locator while referring to the image.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can also be implemented as a computer readable recording medium in which a program for allowing a computer to execute predetermined means, allowing the computer to function as predetermined means, or allowing the computer to realize a predetermined function is recorded.

Each of the above functions can be realized as software.

The arrangements shown in the embodiments of the present invention are merely examples and do not exclude other arrangements. The exemplified arrangements may be partially replaced with another arrangement, partially omitted, or added with another function or element. Another arrangement obtained by combining the arrangements is also possible. Another arrangement that is logically equivalent to the exemplified arrangements, another arrangement including a portion that is logically equivalent to the exemplified arrangements, or another arrangement that is logically equivalent to main part of the exemplified arrangements is also possible. Another arrangement that achieves the same or similar object as the exemplified arrangements or another arrangement that exhibits the same or similar effect as the exemplified arrangements is also possible.

Various kinds of modifications for various components exemplified in the embodiments of the present invention can be appropriately combined.

The embodiments of the present invention incorporates inventions about various viewpoints, phases, concepts, and categories, such as inventions as individual apparatuses, inventions of two or more related apparatuses, inventions as entire systems, inventions for components in individual apparatuses, and inventions of corresponding methods.

Hence, an invention can be extracted from the contents disclosed in the embodiments of the present invention without any limitation to the exemplified arrangements.

What is claimed is:

1. A spatiotemporal locator processing method of correcting a spatiotemporal locator capable of specifying trajectories of representative points of an approximate figure representing an arbitrary object in order to represent a transition of the object in video data over a plurality of frames, the spatiotemporal locator being defined for each object and including (1) identification information of the object, (2) an object appearing time representing a time at which the object appears, (3) an object disappearing time representing a time at which the object disappears, (4) a shape flag representing a shape of the approximate figure, and (5) trajectory data representing the trajectories of the representative points,
the trajectory data for each representative point including a number of knots of a function approximating the trajectory of the representative point, a first knot appearing time representing a time of a first knot of the function, and polynomial data representing parts of a function between two knots,
each polynomial data including a knot time representing an end knot time, a polynomial order representing an order of the parts of the function, and polynomial coefficient data representing coefficients of a polynomial representing the function,
the method comprising:
obtaining the trajectory of the representative point based on the spatiotemporal locator;
displaying, on a screen, the obtained trajectory of the representative point with the knots and a control point located on the trajectory between two knots, the control point uniquely specifying the trajectory with two knots, wherein movement of the control point affects the trajectory of the representative point only between the two knots between which the control point is located;
receiving input of a correction instruction for the trajectory displayed on the screen, the correction including a movement of the control point in time and space; and
correcting the spatiotemporal locator based on the correction instruction.

2. The method according to claim 1, further comprising:
obtaining the corrected trajectory of the representative point based on the corrected spatiotemporal locator;
displaying the corrected trajectory of the representative point on the screen;
receiving input of another correction instruction for the corrected trajectory of the representative point displayed on the screen; and
correcting the corrected spatiotemporal locator based on the other correction instruction.

3. The method according to claim 1, wherein said step of receiving input of the correction instruction comprises receiving input one of a movement instruction for the control point in an arbitrary direction, an addition instruction of another control point, and a delete instruction of the existing control point.

4. The method according to claim 3, wherein
said step of correcting the spatiotemporal locator comprises correcting the spatiotemporal locator based on a position of one of the moved or added control point and a control point near the deleted control point.

5. The method according to claim 3, wherein
said receiving input of the correction instruction comprises receiving input of one of a movement instruction for the knot, an addition instruction of another knot, and a delete instruction of the knot, and
said step of correcting the spatiotemporal locator comprises correcting the spatiotemporal locator based on a small interval after the movement, addition, or delete is done.

6. The method according to claim 3, wherein
said step of receiving input of the correction instruction comprises receiving input of an addition instruction of another knot of the approximate interval and estimating a shape of the approximate figure at a time of the other knot.

7. The method according to claim 3, wherein
said step of displaying the correction instructing point comprises displaying a number of control points, the knot and the remaining points being displayed in a discriminable display form.

8. The method according to claim 1, wherein said displaying the trajectory comprises displaying a predetermined frame of the video data together with the trajectory of the representative point.

9. The method according to claim 8, wherein said displaying the predetermined frame comprises displaying the frame to be displayed as a translucent image.

10. The method according to claim 8, wherein said displaying the predetermined frame comprises displaying an external shape of the approximate figure in a recognizable display form.

11. The method according to claim 8, wherein said displaying the predetermined frame comprises displaying inside and outside of the approximate figure in different display forms.

12. The method according to claim 1, wherein the position data of at least one representative point comprises data representing a relative position of the at least one representative point with respect to another representative point serving as a reference in the frame.

13. The method according to claim 1, wherein said spatiotemporal locator comprises a parameter of a function approximating a trajectory of a transform parameter of the representative point along a frame sequence, the transform parameter indicating a region transformation from position data of the representative point in a frame serving as a reference of the representative point to position data of the representative point in another frame.

14. The method according to claim 13, wherein the position data of at least one representative point comprises data representing a relative position of the at least one representative point with respect to another representative point serving as a reference in the frame.

15. The method according to claim 1, wherein said displaying the trajectory comprises three-dimensionally displaying the trajectory arranged in a 3D space constructed by 2D coordinate axes and time axis for the frame.

16. The method according to claim 1, wherein said spatiotemporal locator comprises, for each approximate figure or each representative point, flag information to control presence/absence of display of the approximate figure or representative point, and
said correcting the spatiotemporal locator comprising correcting the flag information when the correction influences contents represented by the flag information.

17. The method according to claim 16, wherein said flag information comprises one of information capable of specifying a frame interval in which the approximate figure or representative point is in a visible state and a frame interval in which the approximate figure or representative point is in an invisible state, and information representing priority related to display of the approximate figure or representative point in each frame interval.

18. The method according to claim 1, wherein said spatiotemporal locator comprises information related to a presence range approximate figure that indicates a region including a range in which the approximate figure is present over the plurality of frames, and
said correcting the spatiotemporal locator comprises correcting the information related to a presence range approximate figure when the correction influences contents represented by the presence range approximate figure.

19. The method according to claim 18, wherein said displaying the trajectory comprises displaying the presence range approximate figure together with the trajectory of the representative point.

20. The method according to claim 19, further comprising:
receiving input of a predetermined correction instruction for the displayed presence range approximate figure, and
correcting the presence range approximate figure based on the input correction instruction.

21. The method according to claim 1, wherein said spatiotemporal locator comprises information related to a region of a target object in the video data and described by a parameter of a function approximating a trajectory of position data of representative points or data specifying the representative points along a frame sequence, wherein the target object is specified by an approximate figure in order to represent information related to a region of an arbitrary object that transits through a panoramic image generated by connecting adjacent frames of a plurality of arbitrary continuous frames in the video data with overlapping each other and the approximate figure includes the representative points.

22. The method according to claim 21, further comprising:
displaying the video data as the panoramic image; and
displaying, on the displayed panoramic image, the trajectory obtained based on the spatiotemporal locator.

23. A spatiotemporal locator processing apparatus for correcting a spatiotemporal locator capable of specifying trajectories of representative points of an approximate figure representing an arbitrary object in order to represent a transition of the object in video data over a plurality of frames, the spatiotemporal locator being defined for each object and including (1) identification information of the object, (2) an object appearing time representing a time at which the object appears, (3) an object disappearing time representing a time at which the object disappears, (4) a shape flag representing a shape of the approximate figure, and (5) trajectory data representing the trajectories of the representative points,
the trajectory data for each representative point including a number of knots of a function approximating the trajectory of the representative point, a first knot appearing time representing a time of a first knot of the function, and polynomial data representing parts of a function between two knots,
each polynomial data including a knot time representing an end knot time, a polynomial order representing an order of the parts of the function, and polynomial coefficient data representing coefficients of a polynomial representing the function,
the apparatus comprising:
a unit configured to obtain the trajectory of the representative point based on the spatiotemporal locator;
a unit configured to display, on a screen, the obtained trajectory of the representative point with the knots and a control point located on the trajectory between two knots, the control point uniquely specifying the trajectory with the two knots, wherein movement of the control point affects the trajectory of the representative point only between the two knots between which the control point is located;
a unit configured to receive input of a correction instruction for the trajectory displayed on the screen, the correction including movement of the control point in time and space; and
a unit configured to correct the spatiotemporal locator based on the correction instruction.

24. An article of manufacture comprising a computer usable medium having a computer readable program code means for correcting a spatiotemporal locator capable of specifying a trajectories of representative points of an approximate figure representing an arbitrary object in order to represent a transition of the object in video data over a plurality of frames, embodied therein, the spatiotemporal locator being defined for each object and including (1) identification information of the object, (2) an object appearing time representing a time at which the object appears, (3) an object disappearing time representing a time at which the object disappears, (4) a shape flag representing a shape of the approximate figure, and (5) trajectory data representing the trajectories of the representative points,
the trajectory data for each representative point including a number of knots of a function approximating the trajectory of the representative point, a first knot appearing time representing a time of a first knot of the function, and polynomial data representing parts of a function between two knots,
each polynomial data including a knot time representing an end knot time, a polynomial order representing an order of the parts of the function, and polynomial coefficient data representing coefficients of a polynomial representing the function, the computer readable program code means comprising:

computer readable program code means for causing a computer to obtain the trajectory of the representative point based on the spatiotemporal locator;

computer readable program code means for causing a computer to display, on a screen, the obtained trajectory of the representative point with the knots and a control point located on the trajectory between two knows, the control point uniquely specifying the trajectory with the two knots, wherein movement of the control point affects the trajectory of the representative point only between the two knots between which the control point is located;

computer readable program code means for causing a computer to receive input of a correction instruction for the trajectory displayed on the screen, the correction including movement of the control point in time and space; and computer readable program code means for causing a computer to correct the spatiotemporal locator based on the correction instruction.

* * * * *